United States Patent
Yano

(10) Patent No.: US 8,913,270 B2
(45) Date of Patent: Dec. 16, 2014

(54) AUTHENTICATION SYSTEM HAVING AN AUTHENTICATION APPARATUS INCLUDING AN AUTHENTICATION UNIT CONFIGURED TO SEARCH RECORDS OF IDENTIFICATION INFORMATION ASSOCIATED WITH GROUP INFORMATION TO FIND MATCHING IDENTIFICATION INFORMATION MATCHING OBTAINED IDENTIFICATION INFORMATION OF A USER, AUTHENTICATION METHOD, AND APPARATUS

(71) Applicant: Shunsuke Yano, Kanagawa (JP)

(72) Inventor: Shunsuke Yano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 6 days.

(21) Appl. No.: 13/736,165

(22) Filed: Jan. 8, 2013

(65) Prior Publication Data
US 2013/0182279 A1    Jul. 18, 2013

(30) Foreign Application Priority Data
Jan. 13, 2012 (JP) ................................ 2012-004854
Dec. 13, 2012 (JP) ................................ 2012-272713

(51) Int. Cl.
| G06K 15/00 | (2006.01) |
| H04N 1/44  | (2006.01) |
| H04N 1/00  | (2006.01) |
| G06F 21/32 | (2013.01) |

(52) U.S. Cl.
CPC .... *H04N 1/00854* (2013.01); *H04N 2201/0094* (2013.01); *H04N 1/442* (2013.01); *H04N 1/4426* (2013.01); *G06F 21/32* (2013.01)

USPC .................. 358/1.14; 715/186; 726/2; 726/4; 726/18; 726/30

(58) Field of Classification Search
CPC ............ H04N 21/00; H04N 21/25816; H04N 21/25875; H04N 21/4182; H04N 21/441; H04N 21/4415
USPC .......... 358/1.1–3.29; 380/229–234; 726/1–30
See application file for complete search history.

(56) References Cited

U.S. PATENT DOCUMENTS

| 2001/0036297 A1* | 11/2001 | Ikegami et al. ................ 382/115 |
| 2010/0002250 A1* | 1/2010 | Sakagami et al. ............ 358/1.14 |

FOREIGN PATENT DOCUMENTS

| JP | 2005-123699 | 5/2005 |
| JP | 2007-078832 | 3/2007 |

* cited by examiner

*Primary Examiner* — Benny Q Tieu
*Assistant Examiner* — Marcellus Augustin
(74) *Attorney, Agent, or Firm* — IPUSA, PLLC

(57) ABSTRACT

An authentication system includes an apparatus and an authentication apparatus configured to perform authentication of a user of the apparatus. The apparatus includes an identification information obtaining unit configured to obtain identification information of the user and an authentication requesting unit configured to send the obtained identification information and group information indicating a group to which the user belongs to the authentication apparatus to request authentication of the user. The authentication apparatus includes an authentication unit configured to search records of identification information associated with the group information to find matching identification information matching the obtained identification information of the user.

12 Claims, 33 Drawing Sheets

| GROUP ID | USER ID | BIOMETRIC INFORMATION | PASSWORD | EMAIL ADDRESS | FAX |
|---|---|---|---|---|---|
| 10000 | user001 | ********* | ********* | user001@aaa.co.jp | 111-222-333 |
| 11111 | user002 | ********* | ********* | user002@aaa.co.jp | 444-555-666 |
| 50000 | user003 | ********* | ********* | user003@aaa.co.jp | 777-888-999 |
| 51111 | user004 | ********* | ********* | user004@aaa.co.jp | 777-888-999 |
| 51111 | user005 | ********* | ********* | user005@aaa.co.jp | 777-888-999 |
| | | | ... | | |

FIG.5

| GROUP ID | FIRST LEVEL | SECOND LEVEL | ... | Nth LEVEL |
|---|---|---|---|---|
| 10000 | BUSINESS DIVISION A | | | |
| 11000 | BUSINESS DIVISION A | OFFICE C | | |
| 11111 | BUSINESS DIVISION A | OFFICE C | ... | GROUP F |
| | | ... | | |
| 50000 | DIVISION B | | | |
| 51000 | DIVISION B | OFFICE D | | |
| 51111 | DIVISION B | OFFICE D | ... | GROUP G |
| 52000 | DIVISION B | OFFICE E | | |
| 52111 | DIVISION B | OFFICE E | ... | GROUP H |

FIG.6

| USER ID | PASSWORD | EMAIL ADDRESS | FAX |
|---|---|---|---|
| user001 | ****** | user001@aaa.co.jp | 111-222-333 |
| user002 | ***** | user002@aaa.co.jp | 444-555-666 |
|  | ... |  |  |

FIG.7

| GROUP ID | USER ID | BIOMETRIC INFORMATION | PASSWORD | EMAIL ADDRESS | FAX |
|---|---|---|---|---|---|
| 10000 | user001 | ********** | ********** | user001@aaa.co.jp | 111-222-333 |
| 11111 | user002 | ********** | ********** | user002@aaa.co.jp | 444-555-666 |
| 50000 | user003 | ********** | ********** | user003@aaa.co.jp | 777-888-999 |
| 51111 | user004 | ********** | ********** | user004@aaa.co.jp | 777-888-999 |
| 51111 | user005 | ********** | ********** | user005@aaa.co.jp | 777-888-999 |
| | | | ⋮ | | |

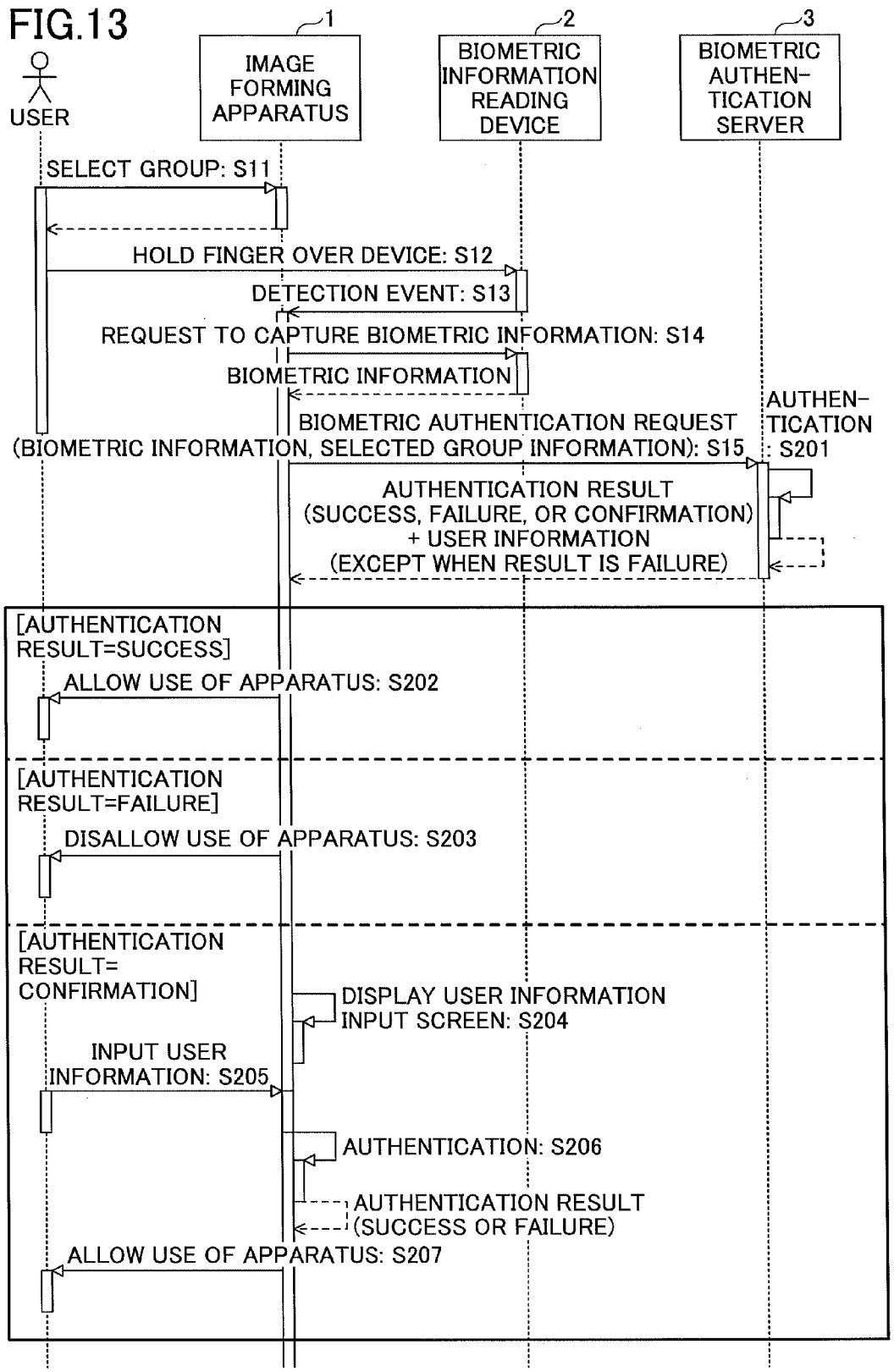

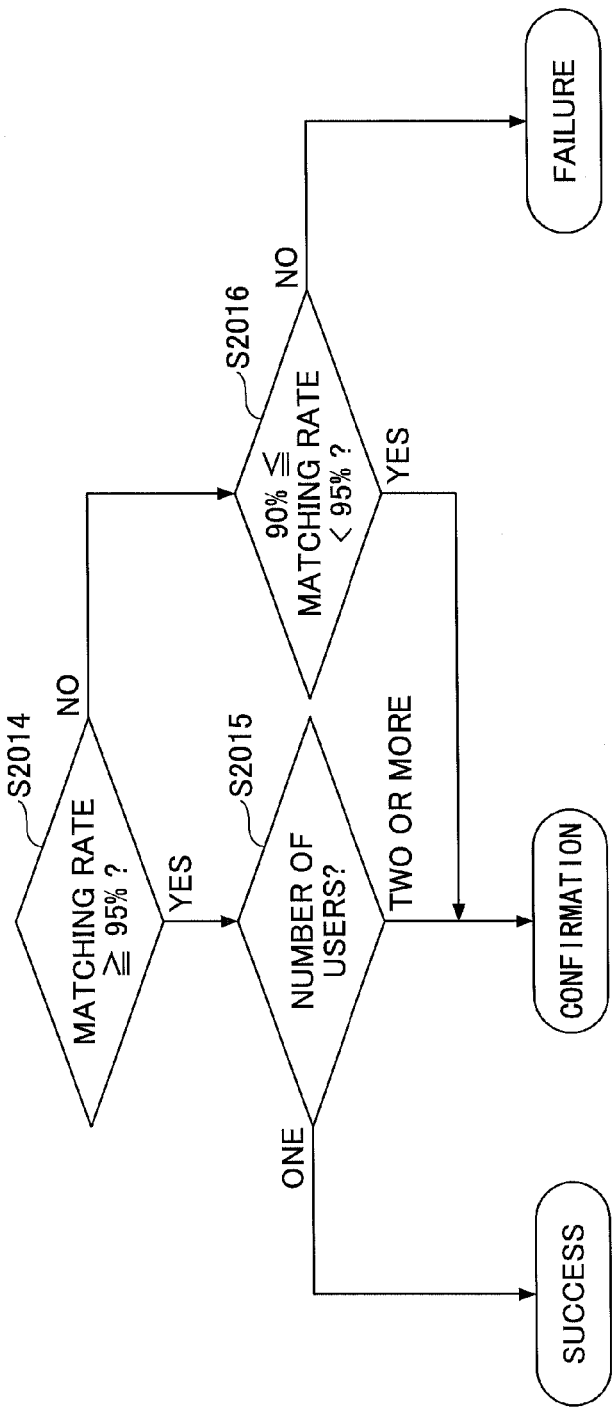

FIG.15A

| MATCHING RATE (X) | AUTHENTICATION RESULT |
|---|---|
| X ≧ 95% | SUCCESS (ALLOW USE OF IMAGE FORMING APPARATUS) |
| 90% ≦ X < 95% | CONFIRMATION (PERFORM AUTHENTICATION BASED ON USER INFORMATION) |
| X < 90% | FAILURE (DISALLOW USE OF IMAGE FORMING APPARATUS) |

FIG.15B

| NUMBER OF USERS | AUTHENTICATION RESULT |
|---|---|
| ONE | DETERMINED DEPENDING ON MATCHING RATE |
| TWO OR MORE | CONFIRMATION (PERFORM AUTHENTICATION BASED ON USER INFORMATION) |

FIG.22C

| COMPANY CODE | USER ID | BIOMETRIC INFORMATION | PASSWORD | EMAIL ADDRESS | FAX |
|---|---|---|---|---|---|
| XXX | user001 | ********** | ********** | user001@aaa.co.jp | 111-222-333 |
| | user002 | ********** | ********** | user002@aaa.co.jp | 444-555-666 |
| YYY | user001 | ********** | ********** | user001@bbb.co.jp | 777-888-999 |
| | user002 | ********** | ********** | user002@bbb.co.jp | 777-888-999 |
| | user003 | ********** | ********** | user003@bbb.co.jp | 777-888-999 |

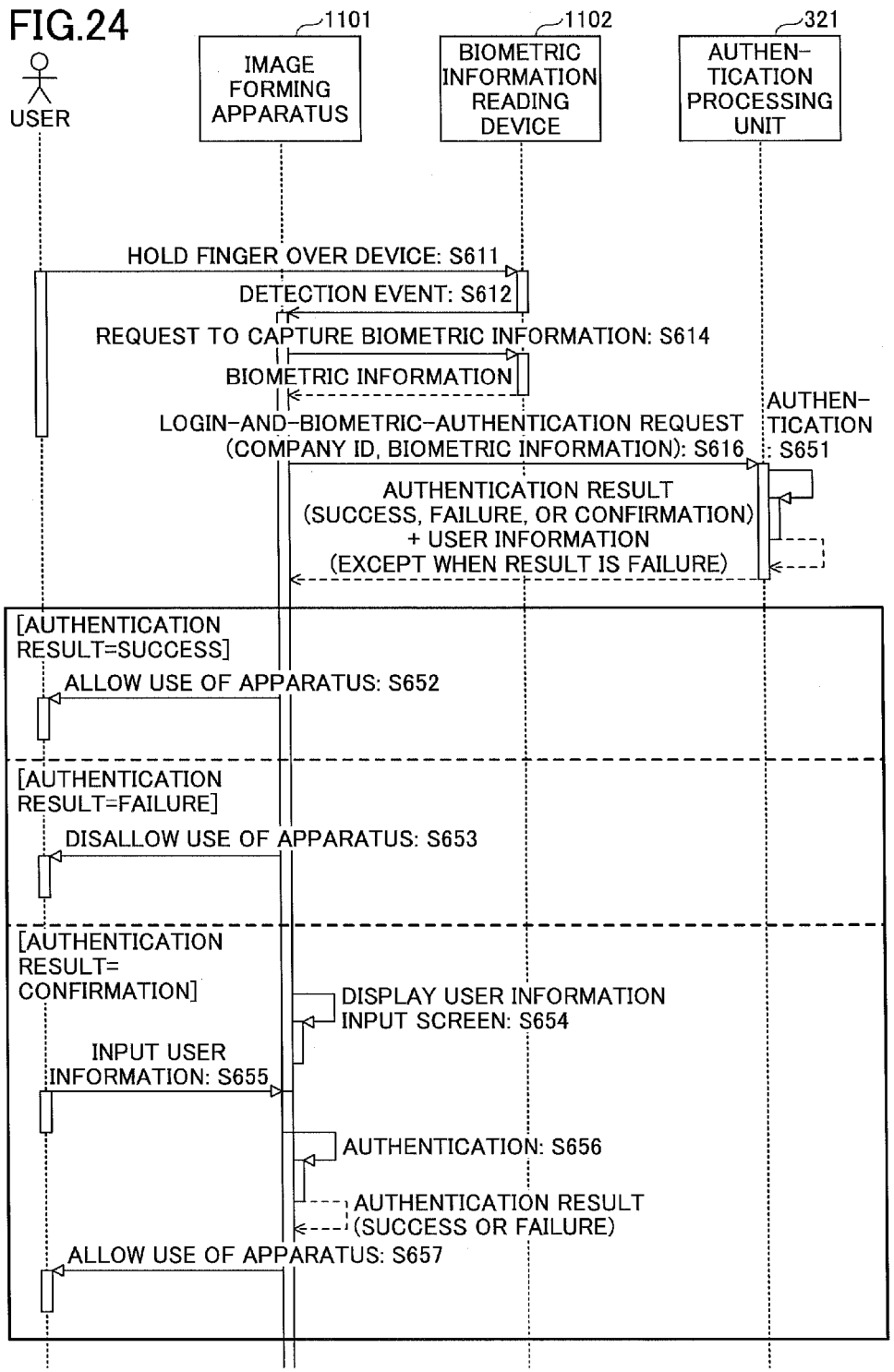

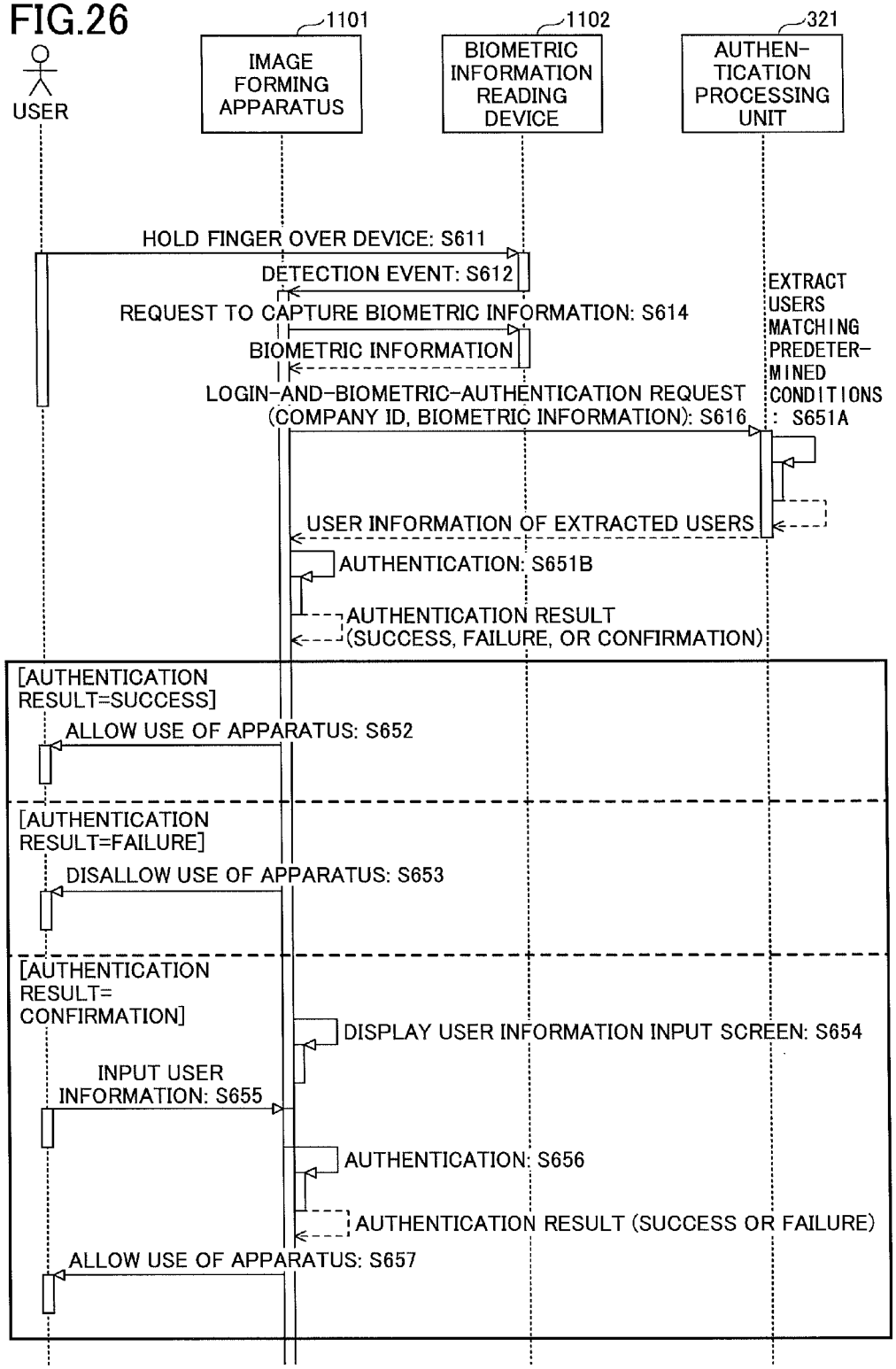

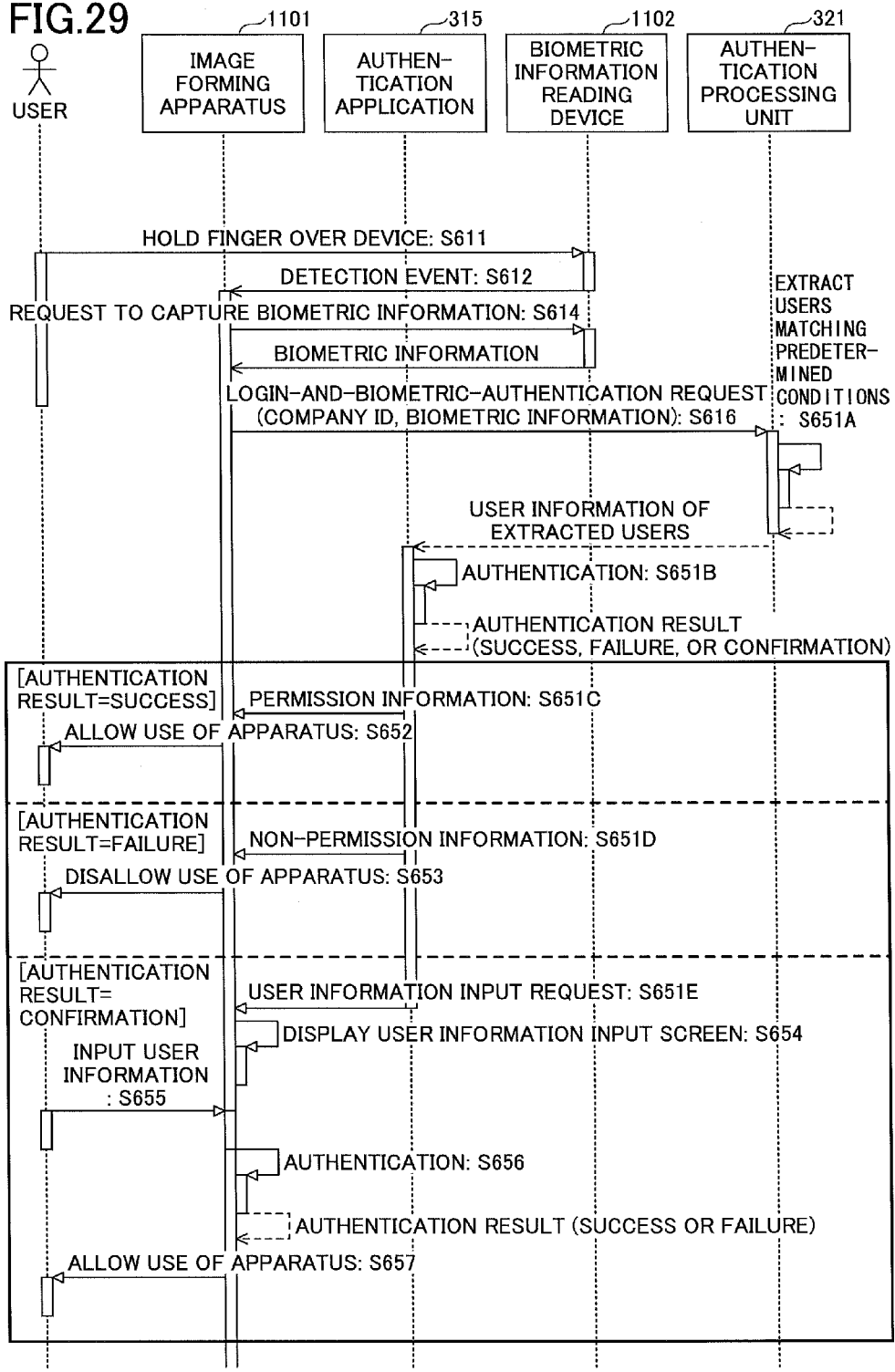

AUTHENTICATION SYSTEM HAVING AN AUTHENTICATION APPARATUS INCLUDING AN AUTHENTICATION UNIT CONFIGURED TO SEARCH RECORDS OF IDENTIFICATION INFORMATION ASSOCIATED WITH GROUP INFORMATION TO FIND MATCHING IDENTIFICATION INFORMATION MATCHING OBTAINED IDENTIFICATION INFORMATION OF A USER, AUTHENTICATION METHOD, AND APPARATUS

CROSS-REFERENCE TO RELATED APPLICATIONS

The present application is based upon and claims the benefit of priority of Japanese Patent Application No. 2012-004854 filed on Jan. 13, 2012 and Japanese Patent Application No. 2012-272713 filed on Dec. 13, 2012, the entire contents of which are incorporated herein by reference.

BACKGROUND OF THE INVENTION

1. Field of the Invention

An aspect of this disclosure relates to an authentication system, an authentication method, and an apparatus.

2. Description of the Related Art

In an organization such as a company, an image forming apparatus (e.g., a multifunction peripheral including a facsimile function, a scanning function, and a copying function) is often connected via a network to plural computer terminals to share the image forming apparatus. In such an environment, it is necessary to maintain the security of image data handled on the network.

For example, Japanese Laid-Open Patent Publication No. 2005-123699 discloses an image forming apparatus employing biometric authentication to maintain security. Biometric authentication provides higher security compared with authentication based on user IDs and passwords or IC cards.

However, since biometric authentication based on biometric information is a complex process, it tends to take a long time and may sometimes produce different authentication results for the same user depending on the conditions of the biometric information. Accordingly, while biometric authentication improves security, there are also some disadvantages in using biometric authentication.

SUMMARY OF THE INVENTION

In an aspect of this disclosure, there is provided an authentication system including an apparatus and an authentication apparatus configured to perform authentication of a user of the apparatus. The apparatus includes an identification information obtaining unit configured to obtain identification information of the user and an authentication requesting unit configured to send the obtained identification information and group information indicating a group to which the user belongs to the authentication apparatus to request authentication of the user. The authentication apparatus includes an authentication unit configured to search records of identification information associated with the group information to find matching identification information matching the obtained identification information of the user.

BRIEF DESCRIPTION OF THE DRAWINGS

FIG. 5 is a table illustrating exemplary group information;

FIG. 6 is a table illustrating exemplary user information;

FIG. 7 is a table illustrating exemplary biometric authentication information stored in a biometric authentication server;

FIG. 13 is a sequence chart illustrating a second exemplary biometric authentication process (P2);

FIG. 14B is a flowchart illustrating a second example of step S201 of FIG. 13;

FIG. 15A is a table illustrating exemplary information used in the process of FIG. 14A;

FIG. 15B is a table illustrating exemplary information used in the process of FIG. 14B;

FIG. 22C is a table illustrating exemplary biometric authentication information stored in a user management information storing unit;

FIG. 24 is a sequence chart illustrating a second exemplary biometric authentication process (P4) in an authentication system employing a cloud service;

FIG. 26 is a sequence chart illustrating the first variation of the second exemplary biometric authentication process (P4);

FIG. 29 is a sequence chart illustrating the second variation of the second exemplary biometric authentication process (P4).

DESCRIPTION OF THE PREFERRED EMBODIMENTS

Preferred embodiments of the present invention are described below with reference to the accompanying drawings.

<Configuration of Authentication System>

Figure 1:
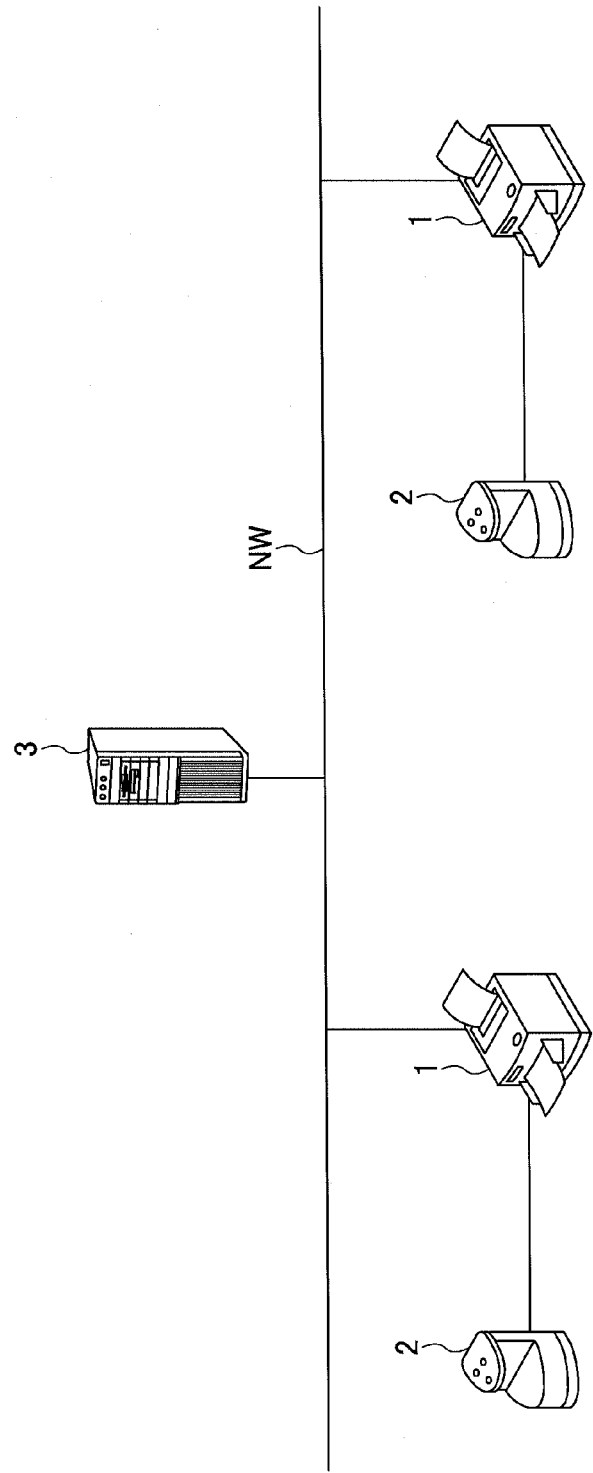
FIG. 1 is a drawing illustrating an exemplary configuration of an authentication system.

FIG. 1 is a drawing illustrating an exemplary configuration of an authentication system AS1 according to an embodiment. The authentication system AS1 may include one or more (in this example, two) image forming apparatuses 1 that authenticated users are allowed to use, biometric information reading devices 2 connected to the respective image forming apparatuses 1, and at least one biometric authentication server 3. The image forming apparatuses 1 and the biometric authentication server 3 are connected to each other via a network NW. The biometric information reading devices 2 may also be connected to the network NW. For descriptive purposes, the image forming apparatuses 1 and the biometric information reading devices 2 may be referred as the image forming apparatus 1 and the biometric information reading device 2.

The image forming apparatus 1 obtains biometric information of the user, which is to be used as authentication information for authenticating the user, via the biometric information reading device 2, and sends the biometric information to the biometric authentication server 3. The biometric authentication server 3 receives the biometric information, compares the biometric information with pre-stored biometric information to perform user authentication, and sends the authentication result to the image forming apparatus 1. The image forming apparatus 1 receives the authentication result and controls operations of the image forming apparatus 1. For example, the image forming apparatus 1 allows the user to use or prevent the user from using the image forming apparatus 1.

In the authentication system AS1, the user selects a group to which the user belongs on a group selection screen displayed on an operating display unit (e.g., an operation panel or a console) of the image forming apparatus 1. The biometric authentication server 3 limits the search range of biometric information based on identification information (which may be referred to as "selected group information") indicating the group selected by the user to efficiently perform an authentication process and thereby reduce the time necessary for the authentication process. The "selected group information" is an example of "group information for identifying a group to which a user belongs".

Instead of the operating display unit, any other device, such as a keyboard or a display connected to the image forming apparatus 1, may be used to allow the user to select a group.

<Hardware Configuration of Image Forming Apparatus>

Figure 2:
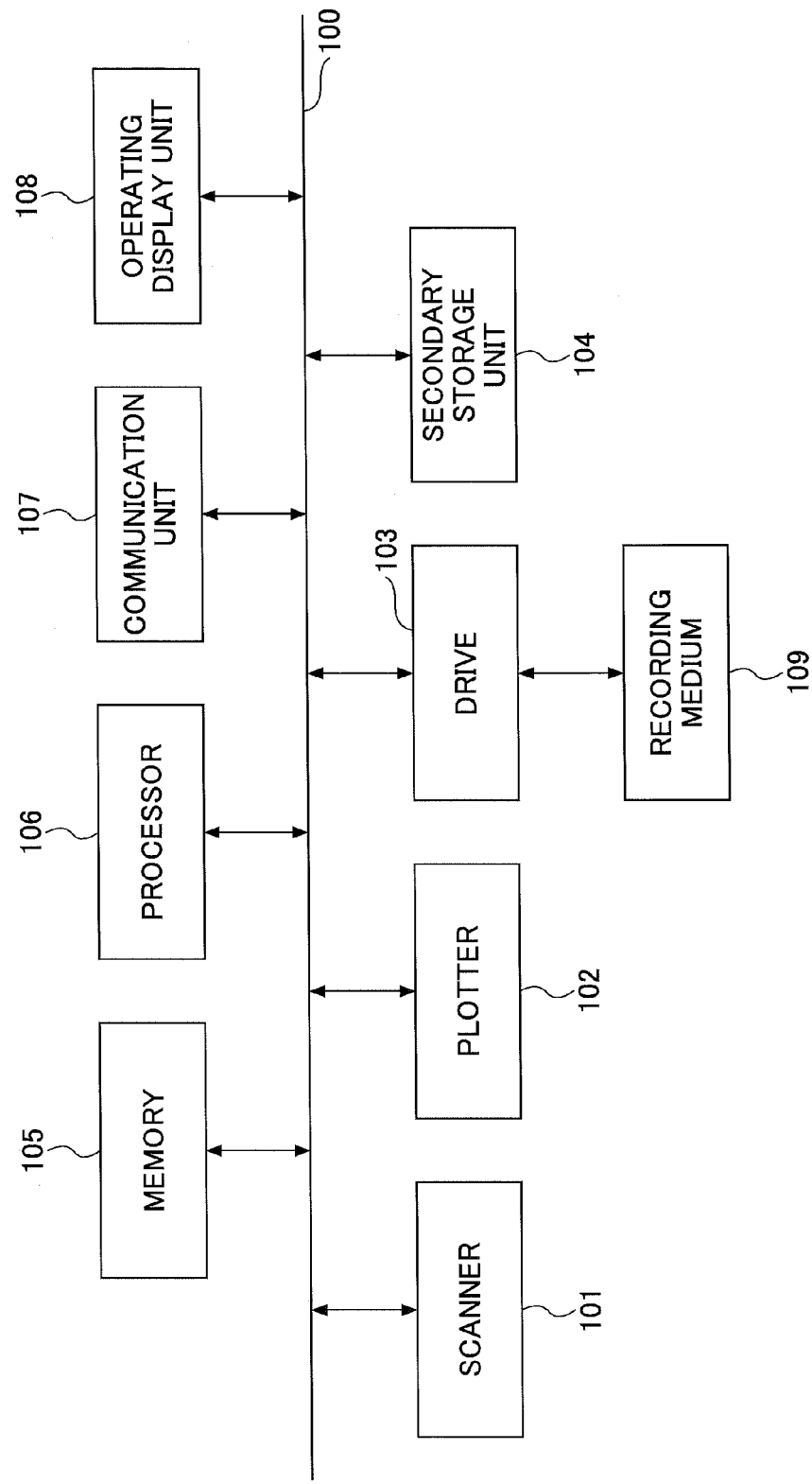
FIG. 2 is a block diagram illustrating an exemplary hardware configuration of an image forming apparatus.

FIG. 2 is a block diagram illustrating an exemplary hardware configuration of the image forming apparatus 1.

The image forming apparatus 1 may include a scanner 101, a plotter 102, a drive 103, a secondary storage unit 104, a memory 105, a processor (e.g., CPU) 106, a communication unit 107, and an operating display unit 108 that are connected to each other via a bus 100.

The scanner 101 includes a scanner engine (not shown) and an engine controller (not shown) for controlling the scanner engine, and scans a document to obtain image data. The plotter 102 includes a plotter engine (not shown) and an engine controller (not shown) for controlling the plotter engine, and outputs (e.g., prints) image data.

The drive 103 writes and reads information to and from a recording medium 109. For example, the drive 103 reads programs and data (e.g., fixed data) from the recording medium 109. The recording medium 109 may be implemented by any type of medium that records information optically, electrically, or magnetically. Examples of the recording medium 109 include a compact disk read-only memory (CD-ROM), a flexible disk, and a magneto-optical disk. The recording medium 109 may also be implemented by a semiconductor memory such as a read-only memory (ROM) or a flash memory that electrically records information.

The secondary storage unit 104 may be implemented, for example, by a hard disk and stores, for example, programs and data read from the recording medium 109 by the drive 103. The memory 105 may include a ROM (not shown) storing programs executed by the processor 106 to perform various processes and a random access memory (RAM) (not shown) used as a work area by the processor 106 during such processes. The processor 106 controls the entire image forming apparatus 1.

The communication unit 107 may include a modem and a local area network (LAN) card and connects the image forming apparatus 1 to the network NW. The operating display unit 108 may include various operation keys and a liquid crystal display (LCD) touch panel. The operating display unit 108 receives various user inputs for operating the image forming apparatus 1 and displays information to be reported to the user.

<Hardware Configuration of Biometric Authentication Server>

Figure 3:
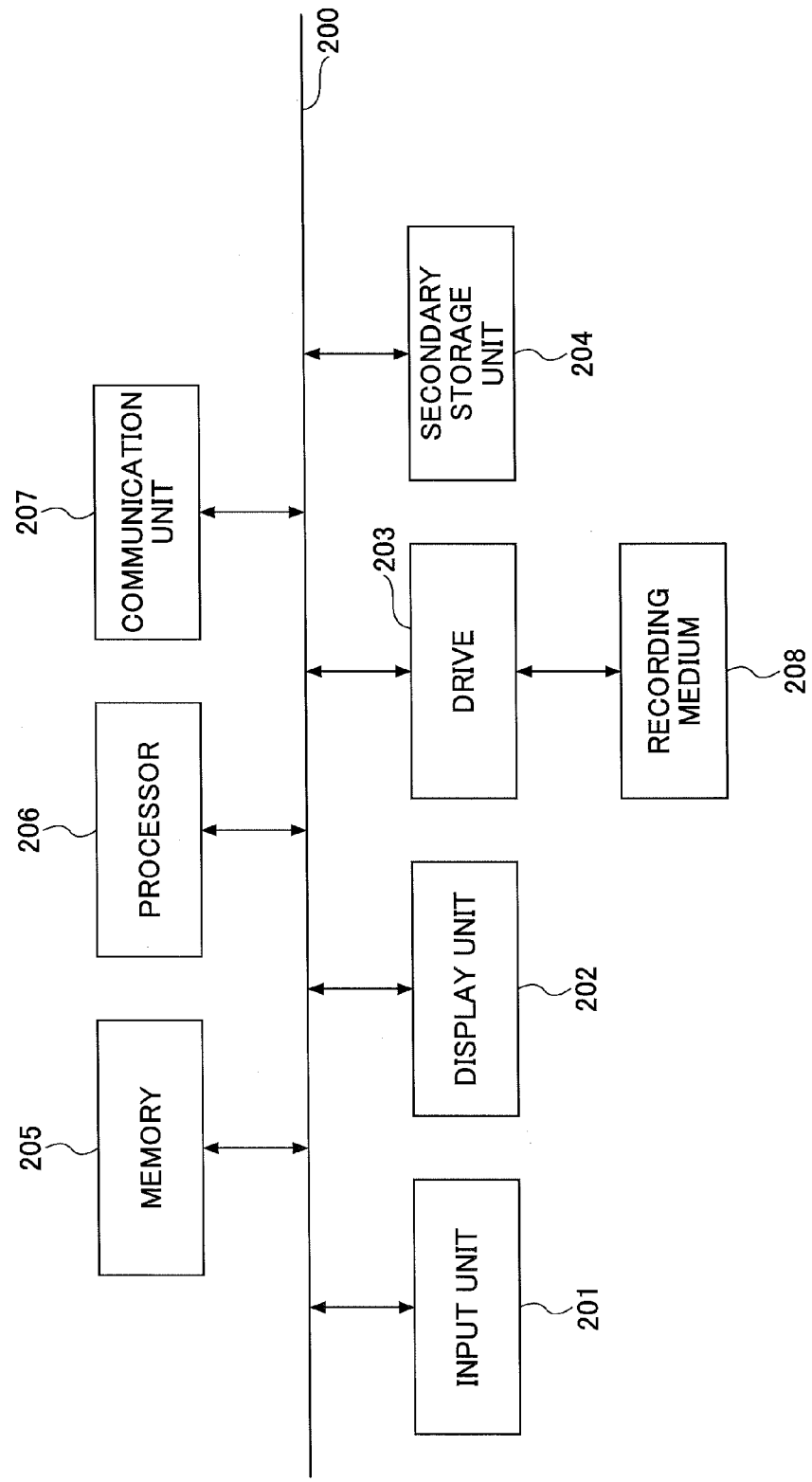
FIG. 3 is a block diagram illustrating an exemplary hardware configuration of a biometric authentication server.

FIG. 3 is a block diagram illustrating an exemplary hardware configuration of the biometric authentication server 3.

The biometric authentication server 3 may include an input unit 201, a display unit 202, a drive 203, a secondary storage unit 204, a memory 205, a processor (e.g., CPU) 206, and a communication unit 207 that are connected to each other via a bus 200.

The input unit 201 may include a keyboard and a mouse (not shown) and is used to input various instructions (or signals). The display unit 202 may include liquid crystal display (LCD) (not shown) and displays various windows and data.

The drive 203, the secondary storage 204, the memory 205, the processor 206, the communication unit 207, and a recording medium 208 have configurations and functions similar to those of the corresponding components of the image forming apparatus 1.

<Functional Configuration of Authentication System>

Figure 4:
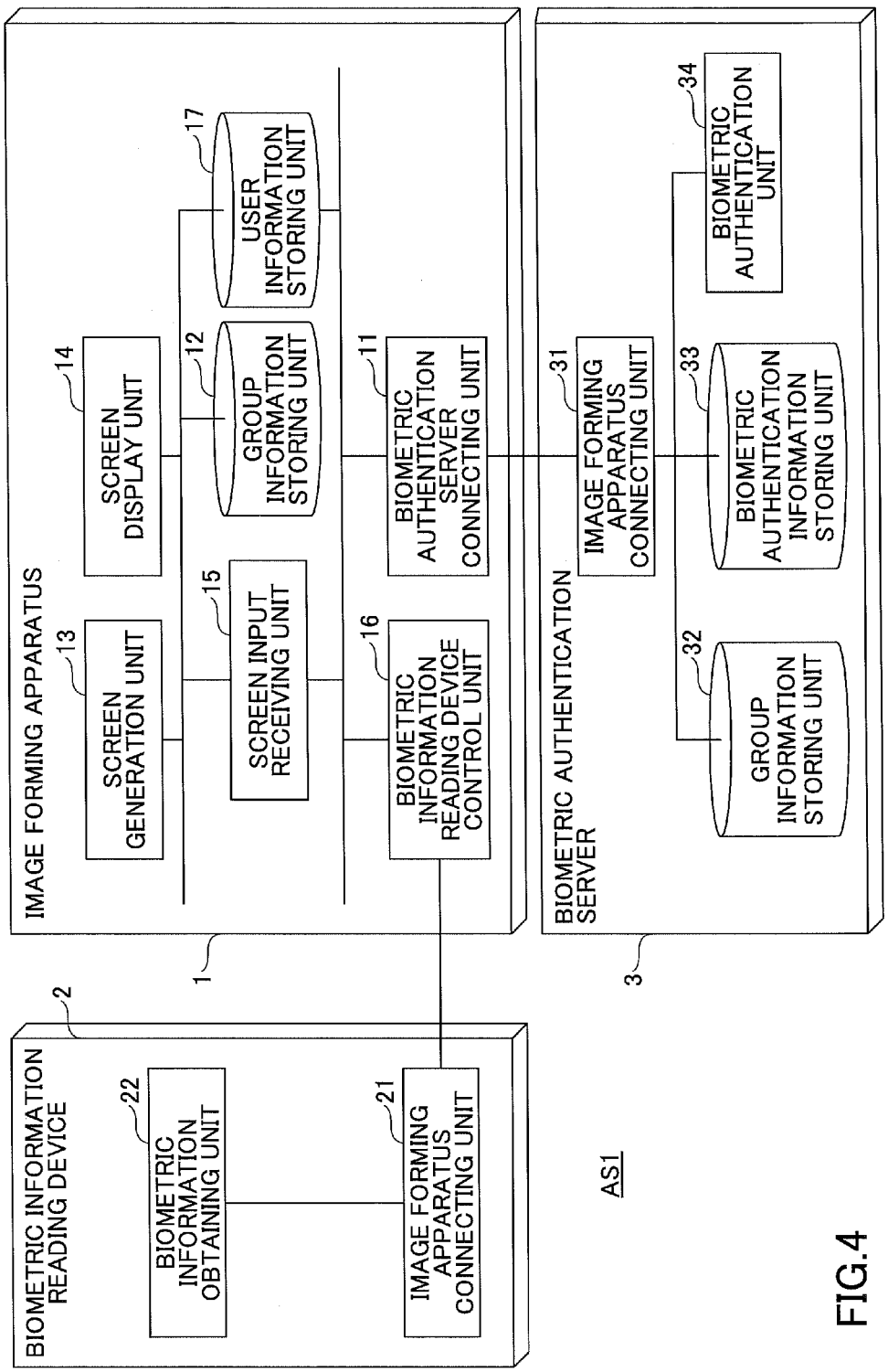
FIG. 4 is a drawing illustrating an exemplary functional configuration of an authentication system.

FIG. 4 is a drawing illustrating functional configurations of the image forming apparatus 1, the biometric information reading device 2, and the biometric authentication server 3.

The image forming apparatus 1 may include a biometric authentication server connecting unit 11, a group information storing unit 12, a screen generation unit 13, a screen display unit 14, a screen input receiving unit 15, a biometric information reading device control unit 16, and a user information storing unit 17. The biometric authentication server connecting unit 11, the screen generation unit 13, the screen display unit 14, the screen input receiving unit 15, and the biometric information reading device control unit 16 are implemented by executing one or more programs installed in the image forming apparatus 1 by the processor 106. The group information storing unit 12 and the user information storing unit 17 may be implemented by, for example, the memory 105 or the secondary storage unit 104. Components of the image forming apparatus 1 that are not essential to describe the present invention are omitted.

The biometric authentication server connecting unit 11 communicates with the biometric authentication server 3, for example, to obtain group information and request biometric authentication. The group information storing unit 12 stores group information obtained from the biometric authentication server 3 where the group information is managed. However, the group information may be obtained from any other apparatus or location as long as the group information is shared by the image forming apparatus 1 and the biometric authentication server 3.

FIG. 5 is a table illustrating exemplary group information. As illustrated in FIG. 5, group information may include a group ID field and first through nth level fields that are associated with the group ID field. The first level field may contain information indicating a division (e.g., business division A), the second level field may contain information indicating a section or a subdivision (e.g., section C), and the nth level field may contain information indicating a group (e.g., group F).

Referring back to FIG. 4, the screen generation unit 13 generates a group selection screen based on the group information. The screen display unit 14 displays the group selection screen generated by the screen generation unit 13. The screen input receiving unit 15 receives selection of a group from the user. The biometric information reading device control unit 16 controls the biometric information reading device 2.

The user information storing unit 17 stores user information as illustrated in FIG. 6. Referring to FIG. 6, the user information may include a user ID, a password, an email address, and a facsimile number. However, information items included in the user information are not limited to those exemplified in FIG. 6. Other information items may be added to the user information or unnecessary information items may be removed from the user information of FIG. 6. Also, instead of storing the user information in the image forming apparatus 1, the user information may be stored in the biometric authentication server 3. In this case, the image forming apparatus 1 may be configured to receive or obtain the user information from the biometric authentication server 3 as necessary (e.g., the image forming apparatus 1 may receive the user information together with an authentication result from the biometric authentication server 3).

The biometric information reading device 2 may include an image forming apparatus connecting unit 21 and a biometric information obtaining unit 22. Components of the biometric information reading device 2 that are not essential to describe the present invention are omitted. The image forming apparatus connecting unit 21 communicates with the image forming apparatus 1, for example, to receive a biometric information capturing request. The biometric information obtaining unit 22 obtains (or captures) biometric information (e.g., a fingerprint or a palm pattern) of, for example, a finger or a palm held over the biometric information reading device 2.

The biometric authentication server 3 may include an image forming apparatus connecting unit 31, a group information storing unit 32, a biometric authentication information storing unit 33, and a biometric authentication unit 34. The image forming apparatus connecting unit 31 and the biometric authentication unit 34 may be implemented by executing one or more programs installed in the biometric authentication server 3 by the processor 206. The group information storing unit 32 and the biometric authentication information storing unit 33 may be implemented by, for example, the memory 205 or the secondary storage unit 204. Components of the biometric authentication server 3 that are not essential to describe the present invention are omitted.

The image forming apparatus connecting unit 31 communicates with the image forming apparatus 1, for example, to send group information and a biometric authentication result. The group information storing unit 32 stores group information being managed at the biometric authentication server 3. The group information has a configuration as described above with reference to FIG. 5.

The biometric authentication information storing unit 33 stores biometric authentication information including biometric information and the corresponding user information that are registered in advance. FIG. 7 illustrates exemplary biometric authentication information. The biometric authentication information may include a group ID, a user ID, biometric information, a password, an email address, and a facsimile number. The information items in the biometric authentication information may be added or removed except those used for authentication.

Referring back to FIG. 4, the biometric authentication unit 34 performs biometric authentication based on biometric information and selected user information that are sent from the image forming apparatus 1 together with a biometric authentication request. Details of a biometric authentication process are described later.

<Process of Obtaining Group Information>

Figure 8:
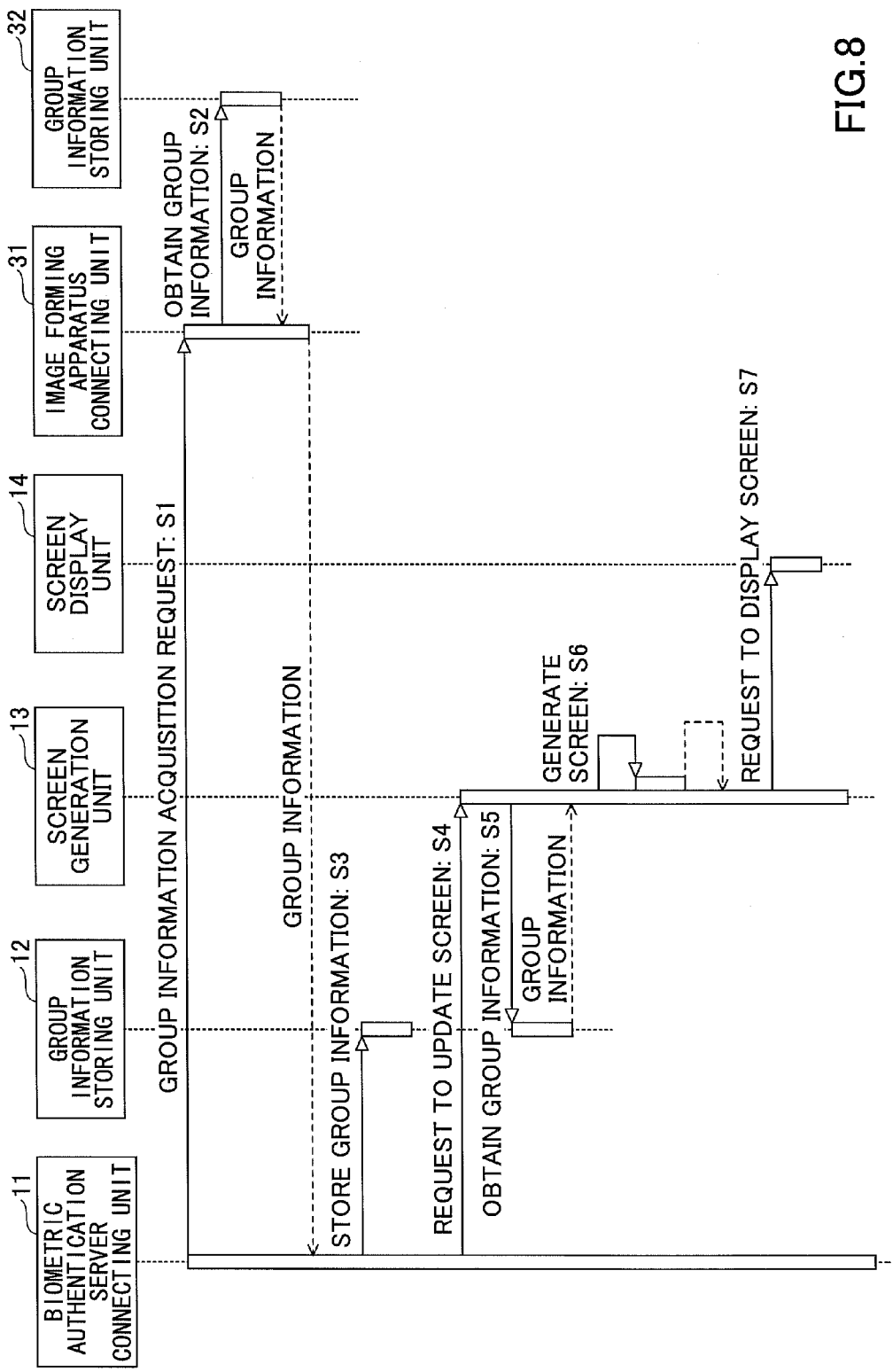
FIG. 8 is a sequence chart illustrating an exemplary process of obtaining group information and displaying a group selection screen.

FIG. 8 is a sequence chart illustrating an exemplary process of obtaining group information and displaying a group selection screen.

As illustrated in FIG. 8, the biometric authentication server connecting unit 11 of the image forming apparatus 1 sends a group information acquisition request to the image forming apparatus connecting unit 31 of the authentication server 3 at predetermined timing (e.g., when the image forming apparatus 1 is turned on or at regular intervals) (step S1).

The image forming apparatus connecting unit 31 obtains group information from the group information storing unit 32 (step S2) and sends the obtained group information to the biometric authentication server connecting unit 11. The biometric authentication server connecting unit 11 receives the group information and stores the received group information in the group information storing unit 12 (step S3).

Next, the biometric authentication server connecting unit 11 requests the screen generation unit 13 to update or generate a screen (step S4). The screen generation unit 13 obtains the group information from the group information storing unit 12 (step S5), and generates a new group selection screen based on the obtained group information (step S6).

After generating the new group selection screen, the screen generation unit 13 requests the screen display unit 14 to display the new group selection screen (step S7). In response, the screen display unit 14 displays the new group selection screen.

Figure 9:
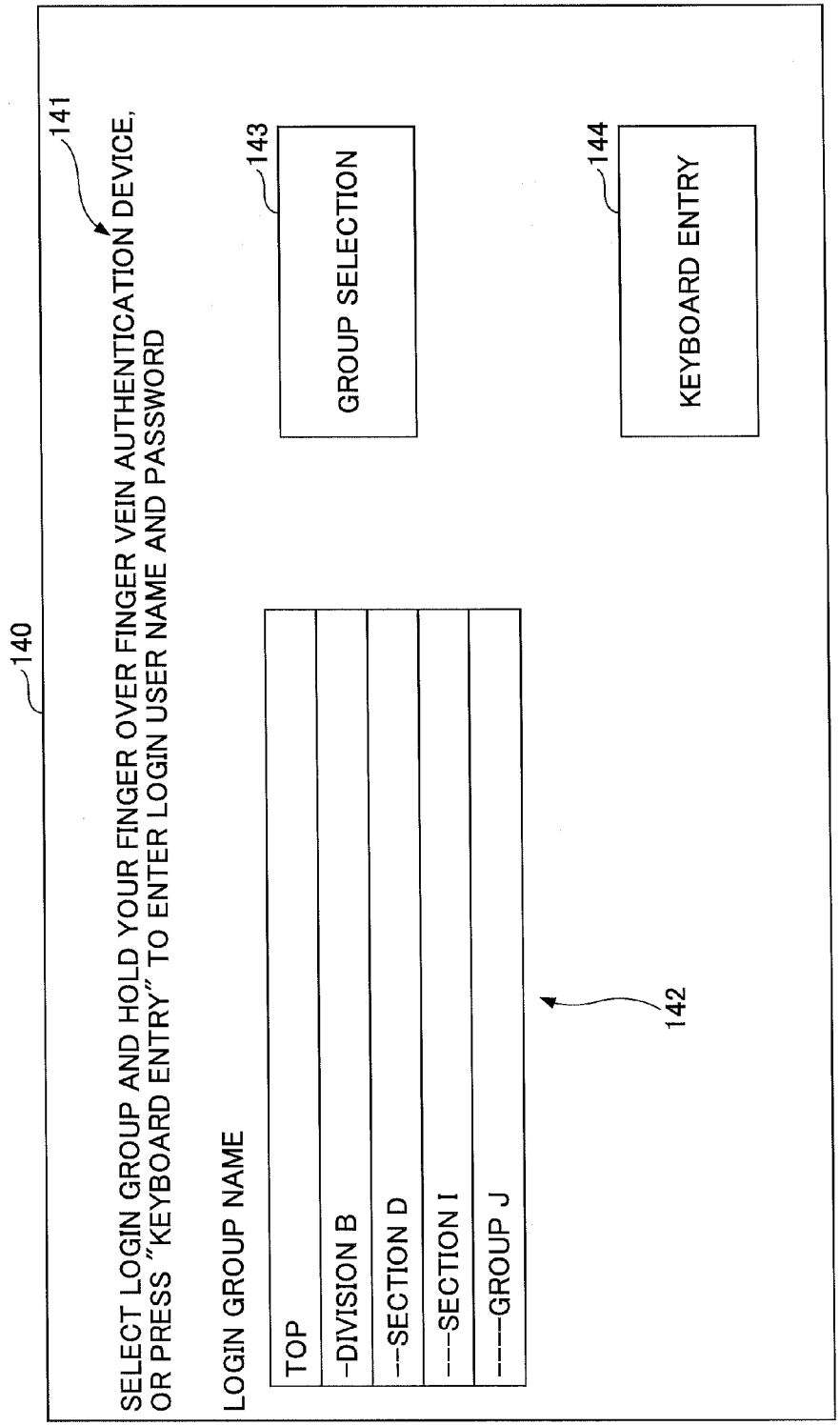
FIG. 9 is a drawing illustrating an exemplary group selection screen.

FIG. 9 illustrates an exemplary group selection screen 140. The group selection screen 140 includes a message 141 prompting the user to select a group and to input biometric information, a login group name list 142, a button 143 for enabling selection of a group, and a button 144 for enabling keyboard entry. In the example of FIG. 9, it is assumed that the biometric information reading device 2 is a finger vein authentication device. However, the biometric information reading device 2 is not limited to such a finger vein authentication system and may be configured to obtain a different type of biometric information, such as a fingerprint or a palm pattern.

<First Exemplary Biometric Authentication Process: Outline>

Figure 10:
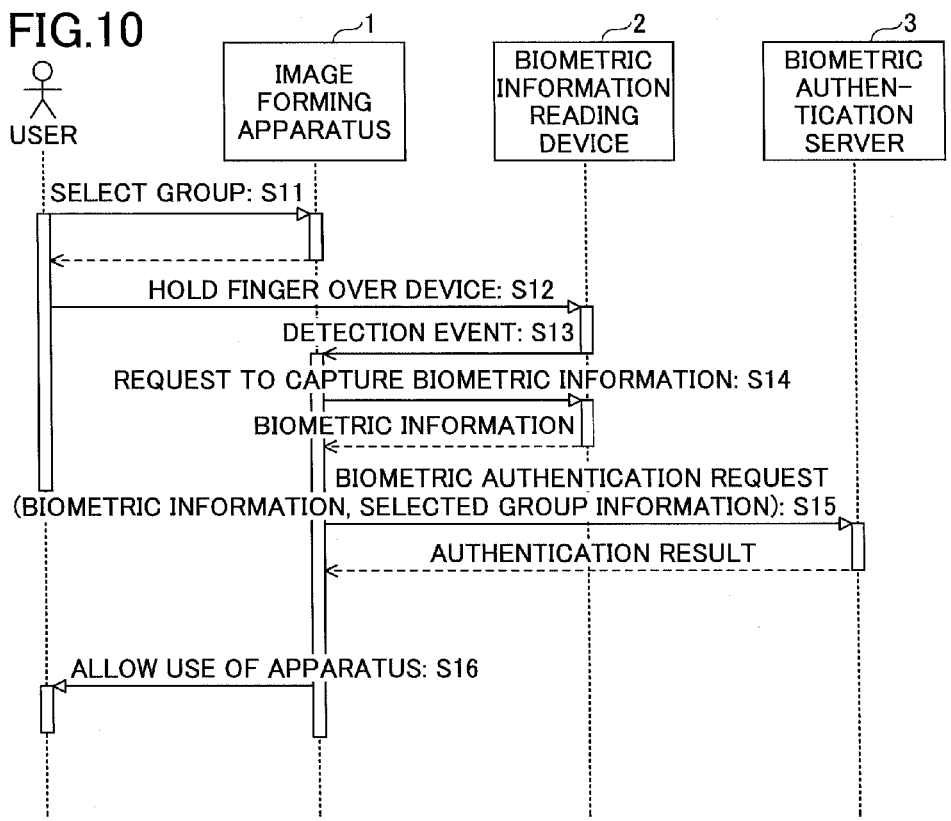
FIG. 10 is a sequence chart illustrating a first exemplary biometric authentication process (P1)

FIG. 10 is a sequence chart illustrating a first exemplary biometric authentication process (P1).

As illustrated in FIG. 10, the user selects a group to which the user belongs on the group selection screen 140 displayed on the image forming apparatus 1 (step S11). Next, the user holds, for example, a finger or a palm over the biometric information reading device 2 (step S12). When detecting the finger or the palm, the biometric information reading device 2 sends event information, which indicates that the finger or the palm is held over the biometric information reading device 2, to the image forming apparatus 1 (step S13).

When receiving the event information, the image forming apparatus 1 requests the biometric information reading device 2 to capture biometric information (step S14). Next, the image forming apparatus 1 sends a biometric authentication request including the captured biometric information sent from the biometric information reading device 2 and selected group information indicating the group selected in step S11 (step S15).

The biometric authentication server 3 performs biometric information based on the captured biometric information and the selected group information in the biometric authentication request and sends an authentication result to the image forming apparatus 1. When the authentication result from the biometric authentication server 3 indicates "success" (successfully authenticated), the image forming apparatus 1 allows the user to use the image forming apparatus 1 (step S16). Meanwhile, when the authentication result indicates "failure" (authentication has failed), the image forming apparatus 1 prevents the user from using the image forming apparatus 1.

<First Exemplary Biometric Authentication Process: Details (1)>

Figure 11:
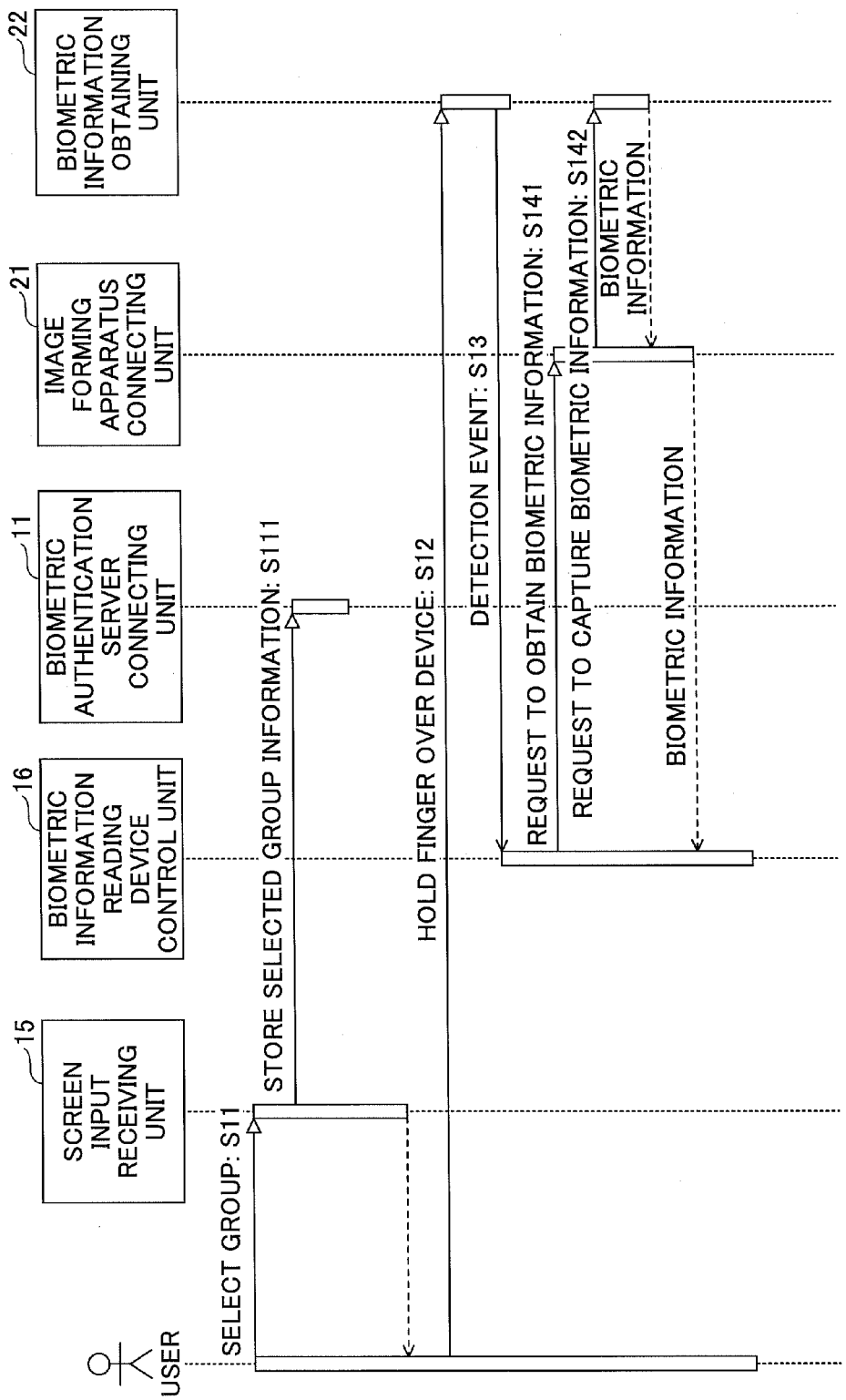
FIG. 11 is a sequence chart illustrating steps S11 through S14 of FIG. 10 in more detail.

FIG. 11 is a sequence chart illustrating steps S11 through S14 of FIG. 10 in more detail. In FIG. 11, the same reference numbers as those used in FIG. 10 are assigned to the corresponding steps.

First, the user selects a group to which the user belongs on the group selection screen 140 displayed on the image forming apparatus 1 (step S11). As a result, the screen input receiving unit 15 receives selected group information indicating the selected group. The screen input receiving unit 15 stores the selected group information in the biometric authentication server connecting unit 11 (step S111).

Next, the user holds, for example, a finger or a palm over the biometric information obtaining unit 22 of the biometric information reading device 2 (step S12). When detecting the finger or the palm, the biometric information obtaining unit 22 sends event information, which indicates that the finger or the palm is held over the biometric information obtaining unit 22, to the biometric information reading device control unit 16 of the image forming apparatus 1 (step S13).

When receiving the event information, the biometric information reading device control unit 16 requests the image forming apparatus connecting unit 21 of the biometric information reading device 2 to obtain biometric information (step S141).

Then, the image forming apparatus connecting unit 21 requests the biometric information obtaining unit 22 to capture biometric information (step S142). The biometric information obtaining unit 22 captures biometric information and sends the captured biometric information to the image forming apparatus connecting unit 21, and the image forming apparatus connecting unit 21 sends the captured biometric information to the biometric information reading device control unit 16.

<First Exemplary Biometric Authentication Process: Details (2)>

Figure 12:
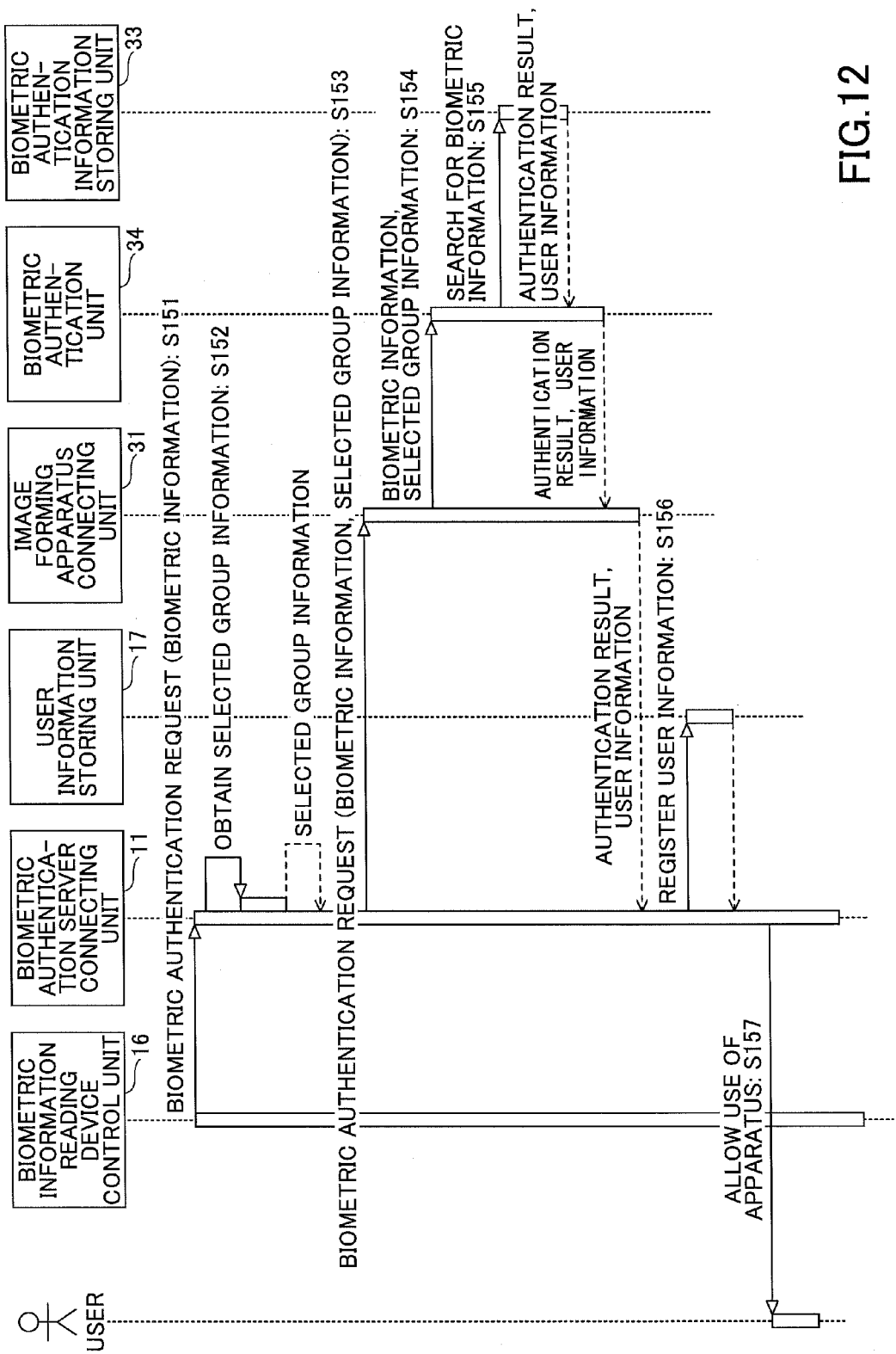
FIG. 12 is a sequence chart illustrating steps S15 and S16 of FIG. 10 in more detail.

FIG. 12 is a sequence chart illustrating steps S15 and S16 of FIG. 10 in more detail.

The biometric information reading device control unit 16 of the image forming apparatus 1 sends a biometric authentication request including the captured biometric information to the biometric authentication server connecting unit 11 (step S151).

The biometric authentication server connecting unit 11 obtains the selected group information indicating a group selected by the user (step S152). Next, the biometric authentication server connecting unit 11 sends a biometric authentication request including the captured biometric information and the selected group information to the image forming apparatus connecting unit 31 of the biometric authentication server 3 (step S153).

Next, the image forming apparatus connecting unit 31 sends the captured biometric information and the selected group information to the biometric authentication unit 34 (step S154).

The biometric authentication unit 34 searches the biometric authentication information storing unit 33 based on the captured biometric information and the selected group information to find biometric information matching the captured biometric information from sets (or records) of biometric information belonging to the group indicated by the selected group information (step S155). When matching biometric information is found, the biometric authentication unit 34 outputs an authentication result "success" and user information corresponding to the found biometric information. Meanwhile, when matching biometric information is not found, the biometric authentication unit 34 outputs an authentication result "failure". In the example of FIG. 12, it is assumed that matching biometric information is found.

Step 155 is described in more detail below. For example, the biometric authentication unit 34 extracts records including the selected group information (i.e., a group ID) from the biometric authentication information (see, for example, FIG. 7) stored in the biometric authentication storing unit 33. Next, the biometric authentication unit 34 selects the extracted records one at a time, and compares the captured biometric information with biometric information in each of the records. When a matching record including biometric information that matches the captured biometric information is found, the biometric authentication unit 34 outputs an authentication result "success" and user information obtained from the matching record. Meanwhile, when no record including biometric information that matches the captured biometric information is found, the biometric authentication unit 34 outputs an authentication result "failure".

Thus, the biometric authentication unit 34 searches only records (biometric authentication information) of users belonging to a group identified by the selected group information.

The biometric authentication unit 34 sends the authentication result and the user information to the image forming apparatus connecting unit 31, and the image forming apparatus connecting unit 31 sends the authentication result and the user information to the biometric authentication server connecting unit 11 of the image forming apparatus 1.

The biometric authentication server connecting unit 11 registers the user information in the user information storing unit 17 (step S156). When the authentication result is "success", the biometric authentication server connecting unit 11 allows the user to use the image forming apparatus 1 (step S157).

<Second Exemplary Biometric Authentication Process>

A second exemplary biometric authentication process (P2) includes, in addition to the steps described with reference to FIGS. 10 through 12, a step of requesting the user to input additional user information (e.g., user ID) to more accurately authenticate the user.

FIG. 13 is a sequence chart illustrating the second exemplary biometric authentication process (P2). Steps S11 through S15 in FIG. 13 are substantially the same as those in FIG. 10.

After step S15, the biometric authentication server 3 performs authentication according to a biometric authentication request received in step S15 (step S201). The biometric authentication server 3 performs biometric authentication based on captured biometric information and selected group information received from the image forming apparatus 1 and the biometric authentication information stored in the biometric authentication information storing unit 33. Then, the biometric authentication server 3 sends an authentication result ("success", "failure", or "confirmation") to the image forming apparatus 1. When the authentication result is other than "failure", the biometric authentication server 3 sends user information together with the authentication result. Details of step S201 is described later with reference to FIGS. 14A, 14B, 15A, and 15B.

When the authentication result from the biometric authentication server 3 is "success", the image forming apparatus 1 allows the user to use the image forming apparatus 1 (step S202). When the authentication result is "failure", the image forming apparatus 1 prevents the user from using the image forming apparatus 1 (step S203). When the authentication result is "confirmation", the image forming apparatus 1 displays a user information input screen (step S204).

When the user inputs user information (e.g., a user ID) on the user information input screen displayed in step S204 (step S205), the image forming apparatus 1 performs an additional authentication step. The image forming apparatus 1 determines whether the entered user information is present in the user information sent from the biometric authentication server 3 (step S206). When the entered user information is present in the user information sent from the biometric authentication server 3, the image forming apparatus 1 allows the user to use the image forming apparatus 1 (step S207). Meanwhile, when the entered user information is not present in the user information sent from the biometric authentication server 3, the image forming apparatus 1 prevents the user from using the image forming apparatus 1.

Figure 14A:
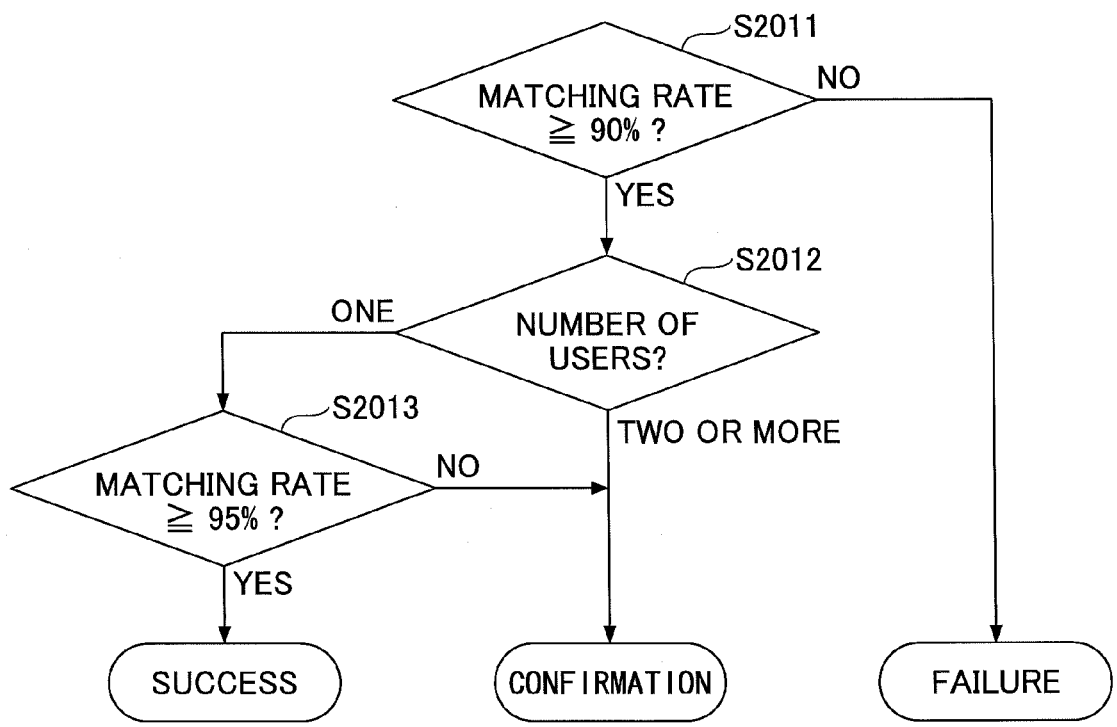
FIG. 14A is a flowchart illustrating a first example of step S201 of FIG. 13.

FIGS. 14A and 14B are flowcharts illustrating first and second examples of step S201 of FIG. 13, and FIGS. 15A and 15B illustrate information used in the processes of FIGS. 14A and 14B to determine the results of authentication.

In the process of FIG. 14A, the biometric authentication server 3 searches the biometric authentication information storing unit 33 based on captured biometric information and selected group information received from the image forming apparatus 1 to find biometric information matching the captured biometric information from sets of biometric information belonging to a group indicated by the selected group information. In other words, the biometric authentication server 3 compares the captured biometric information with sets of biometric information that are stored in the biometric authentication information storing unit 33 and belonging to a group indicated by the selected group information. The biometric authentication server 3 calculates the matching rates (or degrees of similarity) of the sets of biometric information belonging to the group with the captured biometric information and identify biometric information whose matching rate is greater than or equal to 90% (step S2011).

When no biometric information with a matching rate greater than or equal to 90% is found (NO in step S2011), the biometric authentication server 3 sets "failure" as the authentication result. In other words, when the matching rates of all sets of biometric information belonging to the group are less than 90% (NO in step S2011), the biometric authentication server 3 sets "failure" as the authentication result.

When one or more sets of biometric information with matching rates greater than or equal to 90% are found (YES in step S2011), the biometric authentication server 3 determines the number of the sets of biometric information found (i.e., the number of users corresponding to the sets of biometric information with matching rates greater than or equal to 90%) (step S2012). When the number of users is greater than or equal to two in step S2012, the biometric authentication server 3 sets "confirmation" as the authentication result.

Meanwhile, when the number of users is one in step S2012, the biometric authentication server 3 determines whether the matching rate of the corresponding biometric information is greater than or equal to 95% (step S2013). When the matching rate is greater than or equal to 95% (YES in step S2013), the biometric authentication server 3 sets the authentication result as "success". Meanwhile, when the matching rate is less than 95% (i.e. greater than or equal to 90% and less than 95%) (NO in step S2013), the biometric authentication server 3 sets the authentication result as "confirmation".

Here, an exemplary method of calculating the matching rate of biometric information is described. For example, when a fingerprint image is used as biometric information, the fingerprint image is divided into plural areas. The areas of a fingerprint image received from the image forming apparatus 1 are compared with the corresponding areas of a fingerprint image stored in the biometric authentication information storing unit 33. The matching rate can be obtained by calculating the percentage of matching areas of the fingerprint images.

The percentages (90%, 95%) used as thresholds of matching rates in the above process are just examples, and the thresholds may be set at any appropriate values. For example, graded matching levels may be defined in advance. In this case, the matching rates of sets of biometric information stored in the biometric authentication information storing unit 33 with the captured biometric information may be classified into the graded matching levels, and biometric information with matching rates in one of the graded matching levels may be output.

For example, "matching rate: 95%" in the above process may be replaced with "highest matching level" and "matching rate: 90%" may be replaced with "second highest matching level". Also, in FIG. 14A, "matching rate≥90% ?" in step S2011 may be replaced with "highest matching level or second highest matching level?", and "matching rate≥95% ?" in step S2013 may be replaced with "highest matching level?". Similarly, in FIG. 14B, "matching rate≥95% ?" in step S2014 may be replaced with "highest matching level?", and "90%≤matching rate<95% ?" in step S2016 may be replaced with "second highest matching level?".

In the process of FIG. 14B, the biometric authentication server 3 searches the biometric authentication information storing unit 33 based on captured biometric information and selected group information received from the image forming apparatus 1 to find biometric information matching the captured biometric information from sets of biometric information belonging to a group indicated by the selected group information. In other words, the biometric authentication server 3 compares the captured biometric information with sets of biometric information that are stored in the biometric authentication information storing unit 33 and belonging to a group indicated by the selected group information. The biometric authentication server 3 calculates the matching rates (or degrees of similarity) of the sets of biometric information belonging to the group with the captured biometric information. Then, the biometric authentication server 3 determines whether there is one or more sets of biometric information whose matching rate is greater than or equal to 95% (step S2014).

When one or more sets of biometric information with matching rates greater than or equal to 95% are found (YES in step S2014), the biometric authentication server 3 determines the number of the sets of biometric information found (i.e., the number of users corresponding to the sets of biometric information with matching rates greater than or equal to 95%) (step S2015). When the number of users is one in step S2015, the biometric authentication server 3 sets "success" as the authentication result. Meanwhile, when the number of users is greater than or equal to two in step S2015, the biometric authentication server 3 sets "confirmation" as the authentication result.

Meanwhile, when there is no biometric information with a matching rate greater than or equal to 95%, i.e., when the matching rates of all sets of biometric information belonging to the group are less than 95% (NO in step S2014), the biometric authentication server 3 determines whether there is biometric information belonging to the group whose matching rate is greater than or equal to 90% and less than 95% (step S2016). When there is biometric information with a matching rate greater than or equal to 90% and less than 95% (YES in step S2016), the biometric authentication server 3 sets the authentication result as "confirmation". Meanwhile, there is no biometric information with a matching rate greater than or equal to 90% and less than 95% (NO in step S2016), the biometric authentication server 3 sets the authentication result as "failure".

Thus, when one set of biometric information with a matching rate greater than or equal to 95% and two or more sets of biometric information with matching rates greater than or equal to 90% and less than 95% are found, the authentication result is set as "confirmation" in FIG. 14A but is set as "success" in FIG. 14B. As described above, the thresholds of matching rates used to determine the authentication result can be set freely.

In the process of FIG. 14A, when the number of users corresponding to biometric information with matching rates that satisfy conditions for "confirmation" or "success" is greater than one, the authentication result is set as "confirmation" to request the user to enter user information even if biometric information of only one user satisfies the condition for "success".

Meanwhile, in the process of FIG. 14B, when the number of users corresponding to biometric information with matching rates that satisfy the condition for "success" is one, the authentication result is set as "success" even if biometric information of more than one user satisfies the condition for "confirmation".

In the above exemplary processes, three types of authentication results ("success", "failure", and "confirmation") are used. However, the types or the number of authentication results are not limited to those described above. For example, the authentication result may be set as "success" when the matching rate is greater than or equal to 95% and set as "confirmation" when the matching rate is less than 95%.

Also, the second exemplary biometric authentication process (P2) is not necessarily based on the first exemplary biometric authentication process (P1). For example, the second exemplary biometric authentication process (P2) may be performed based only on the captured biometric information received from the image forming apparatus 1. In other words, instead of comparing captured biometric information with sets of biometric information belonging to a selected group, the captured biometric information may be compared with all sets of biometric information stored in the biometric authentication information storing unit 33. In the second exemplary biometric authentication process (P2), biometric authentication is combined with authentication based on input user information to improve the accuracy and efficiency of authentication.

In biometric authentication such as fingerprint authentication, biometric information obtained from the same user may not always be the same. For example, there may be a case where it becomes difficult to correctly capture a fingerprint of a user after the user performs a certain task. As a result, the same user may be successfully authenticated at one occasion but not successfully authenticated at another occasion. Instead of determining success or failure based only on biometric authentication, combining biometric authentication with another authentication method makes it possible to more flexibly and efficiently perform authentication.

Although biometric authentication and authentication based on input user information are combined in the second exemplary biometric authentication process (P2), biometric authentication may be combined with any other authentication method such as authentication using a card. That is, the above described approach may be applied to an authentication system where different authentication methods, i.e., a first authentication method and a second authentication method, are used in combination. In such an authentication system, an authentication result of the first authentication method may be used when the authentication result is "success", and authentication based on the second authentication method may be performed when the authentication result is not "success".

Also, more than two authentication methods may be combined, or an authentication method may be selected from plural authentication methods based on the authentication result of the first authentication method. In this case, conditions corresponding to respective authentication methods may be defined. For example, when the matching rate of biometric information in biometric authentication (first authentication method) is greater than or equal to 80% and less than 85%, "confirmation" may be performed based on a second authentication method. When the matching rate of biometric information in the first authentication method is greater than or equal to 85% and less than 90%, "confirmation" may be performed based on a third authentication method. When the matching rate of biometric information in the first authentication method is greater than or equal to 90% and less than 95%, "confirmation" may be performed based on a fourth authentication method.

In the above embodiments, the biometric authentication server 3 performs authentication processes and stores authentication information. However, the configuration of an authentication system is not limited to that described above. For example, an authentication system may include a target apparatus such as an image forming apparatus whose user is to be authenticated and two or more servers (information processing apparatuses) that collaborate and communicate with each other to perform authentication processes and store authentication information.

<First Variation of Second Exemplary Biometric Authentication Process>

A first variation of the second exemplary biometric authentication process (P2) is described below with reference to FIGS. 16 and 17.

Figure 16:
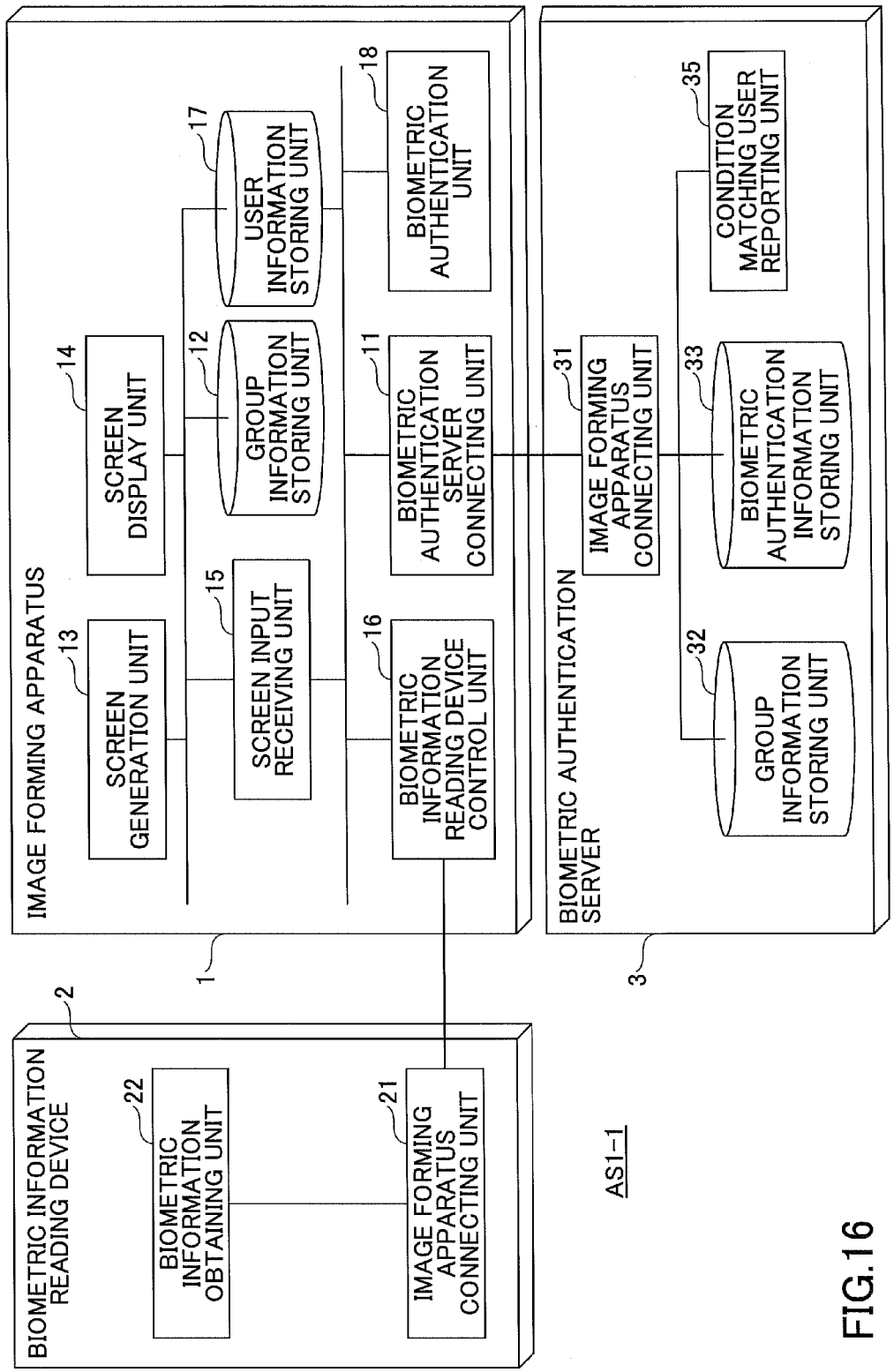
FIG. 16 is a drawing illustrating an exemplary functional configuration of an authentication system adapted for a first variation of the second exemplary biometric authentication process (P2)

FIG. 16 is a drawing illustrating an exemplary functional configuration of an authentication system AS1-1 adapted for the first variation of the second exemplary biometric authentication process (P2). FIG. 17 is a sequence chart illustrating the first variation of the second exemplary biometric authentication process (P2).

The functional configuration of FIG. 16 is different from the functional configuration of FIG. 4 in that the biometric authentication unit 34 of the biometric authentication server 3 is replaced with a condition matching user reporting unit 35, and a biometric authentication unit 18 is added to the image forming apparatus 1. Other components of the authentication system AS1-1 of FIG. 16 are substantially the same as those of the authentication system AS1 of FIG. 4. The biometric authentication unit 18 may be implemented by executing a program installed in the image forming apparatus 1 by the processor 106.

Figure 17:
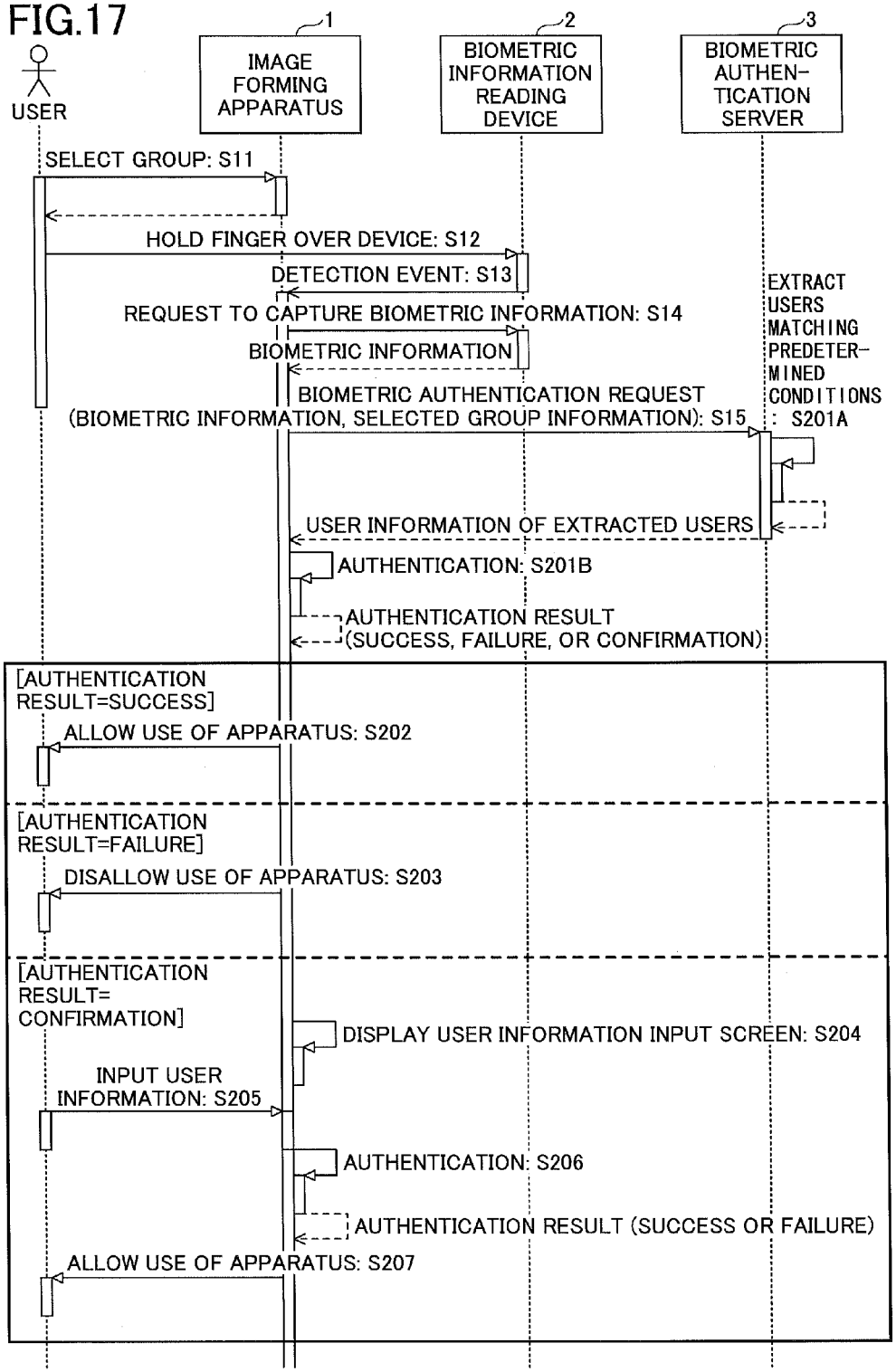
FIG. 17 is a sequence chart illustrating the first variation of the second exemplary biometric authentication process (P2)

The process of FIG. 17 is different from the process of FIG. 13 in steps S201A and S201B. Instead of step S201 of FIG. 13, the condition matching user reporting unit 35 of the biometric authentication server 3 extracts users that match predetermined conditions (step S201A). Then, the condition matching user reporting unit 35 sends user information of the extracted users associated with the corresponding conditions to the image forming apparatus 1.

When receiving the user information, the biometric authentication unit 18 of the image forming apparatus 1 performs authentication as described later (step S201B). Based on the result of authentication, the biometric authentication unit 18 allows the user to use the image forming apparatus 1 (step S202, when the authentication result is "success"), prevents the user from using the image forming apparatus 1 (step S203, when the authentication result is "failure"), or displays a user information input screen (step S204, when the authentication result is "confirmation"). Steps S205 through S207 are substantially the same as those of FIG. 13.

Other configurations and operations of the authentication system AS1-1 are substantially the same as those of the authentication system AS1 described with reference to FIGS. 1 through 15B, and their descriptions are omitted here.

The "predetermined conditions" for extracting users are, for example, "matching rate≥95%" and "matching rate≥90%". In this case, "users that match predetermined conditions" are "users with matching rates greater than or equal to 95%" and "users with matching rates greater than or equal to 90%". Also in this case, the "user information of the extracted users" sent from the biometric authentication server 3 to the image forming apparatus 1 is, for example, "matching rate≥95%: user A; matching rate≥90%: users A and B".

When receiving the "user information of the extracted users", the biometric authentication unit 18 of the image forming apparatus 1 performs authentication according to the flowchart of FIG. 14A or 14B, and outputs an authentication result indicating "success", "failure", or "confirmation".

For example, when user information "matching rate≥95%: user A; matching rate≥90%: users A and B" is received, the result of step S2011 of FIG. 14A becomes "YES" and the result of step S2012 becomes "two or more" (i.e., users A and B). Therefore, in this case, the biometric authentication unit 18 outputs an authentication result "confirmation".

Meanwhile, in the case of FIG. 14B, when user information "matching rate≥95%: user A; matching rate≥90%: users A and B" is received, the result of step S2014 becomes "YES" and the result of step S2015 becomes "one" (i.e., user A). In this case, the biometric authentication unit 18 outputs an authentication result "success".

Preferably, the "predetermined conditions" for extracting users may be set freely at the image forming apparatus 1.

According to the first variation of the second exemplary biometric authentication process (P2) described with reference to FIGS. 16 and 17, the image forming apparatus 1 includes the biometric authentication unit 18 that has a part of the functions of the biometric authentication unit 34 of the biometric authentication server 3 of FIG. 4. This configuration makes it possible to freely define, at the image forming apparatus 1, rules for determining an authentication result based on "user information of the extracted users" reported from the biometric authentication server 3. This in turn makes it possible to more flexibly define the rules for determining an authentication result.

<Second Variation of Second Exemplary Biometric Authentication Process>

A second variation of the second exemplary biometric authentication process (P2) is described below with reference to FIGS. 18 and 19.

Figure 18:
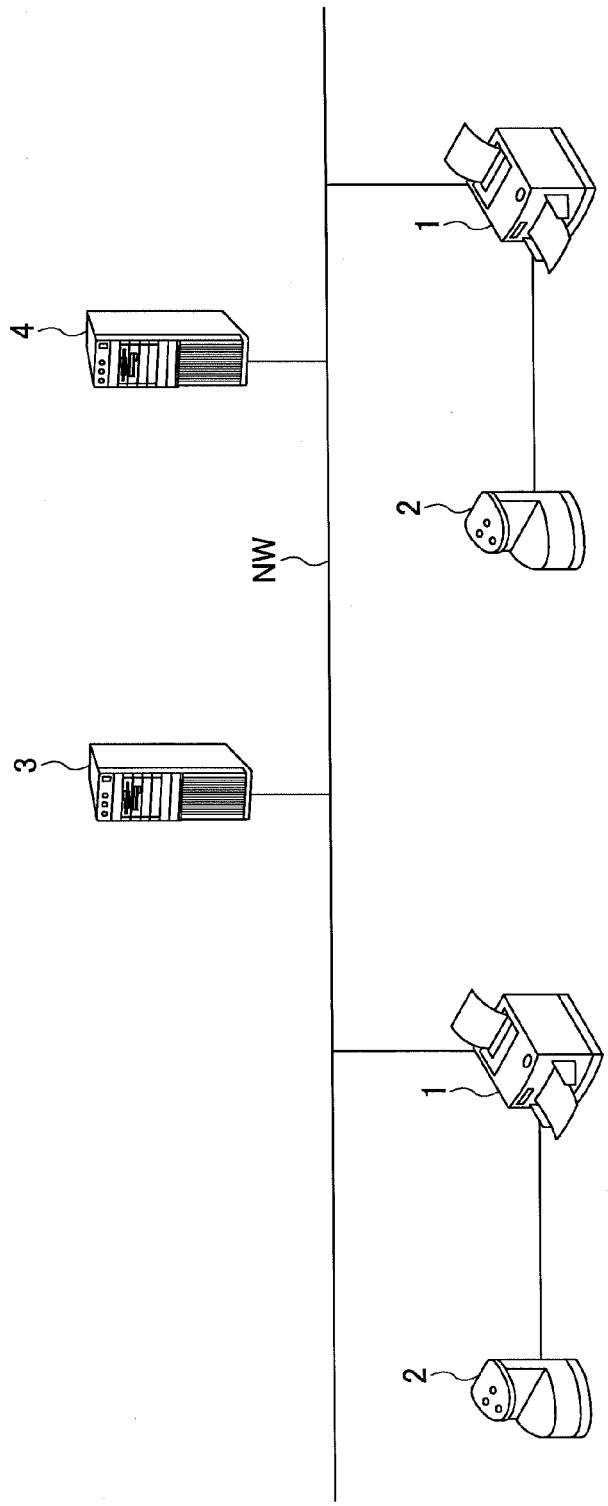
FIG. 18 is a drawing illustrating an exemplary configuration of an authentication system adapted for a second variation of the second exemplary biometric authentication process (P2)

FIG. 18 is a drawing illustrating an exemplary configuration of an authentication system AS2 adapted for the second variation of the second exemplary biometric authentication process (P2). FIG. 19 is a sequence chart illustrating the second variation of the second exemplary biometric authentication process (P2).

The authentication system AS2 of FIG. 18 is different from the authentication system AS1 of FIG. 1 in that an authentication server 4 is additionally connected to the network NW. The authentication server 4 can communicate, via the network NW, with the biometric authentication server 3, the image forming apparatuses 1, and the biometric information reading devices 2. Other configurations of the authentication system AS2 are substantially the same as those of the authentication system AS1 of FIG. 1.

Figure 19:
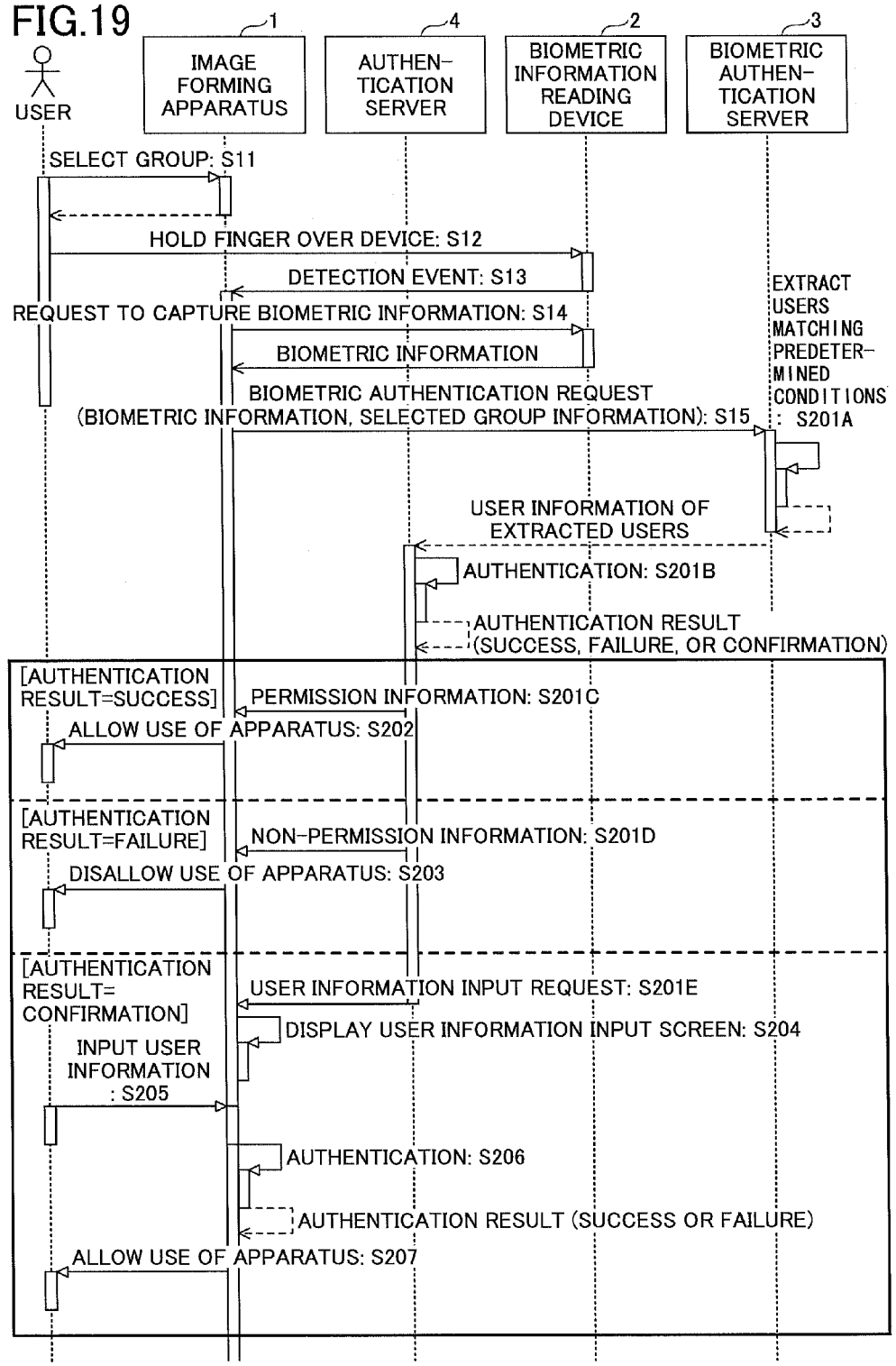
FIG. 19 is a sequence chart illustrating the second variation of the second exemplary biometric authentication process (P2)

The process of FIG. 19 is different from the process of FIG. 17 in steps S201A through S201E. Instead of step S201 of FIG. 13, the biometric authentication server 3 extracts users that match a predetermined condition (step S201A), and sends user information of the extracted users to the authentication server 4. When receiving the user information, the authentication server 4 performs authentication (step S201B). Based on the result of authentication, the authentication server 4 sends permission information to the image forming apparatus 1 to allow the user to use the image forming apparatus 1 (step S201C, when the authentication result is "success"), sends non-permission information to the image forming apparatus 1 to prevent the user from using the image forming apparatus 1 (step S201D, when the authentication result is "failure"), or requests the image forming apparatus 1 to display a user information input screen (step S201E, when the authentication result is "confirmation"). In step S201E, the authentication server 4 sends a user information input request including "user information of the extracted users", which is sent from the biometric authentication server 3 in step S201A, to the image forming apparatus 1.

When receiving the permission information (S201C), the non-permission information (S201D), or the user information input request (S201E), the image forming apparatus 1 allows the user to use the image forming apparatus 1 (step S202, when the permission information is received), prevents the user from using the image forming apparatus 1 (step S203, when the non-permission information is received), or displays a user information input screen (step S204, when the user information input request is received).

When the user information input screen is displayed in step S204 and the user inputs user information (e.g., a user ID) (step S205), the image forming apparatus 1 performs an additional authentication step. The image forming apparatus 1 determines whether the entered user information is present in the "user information of the extracted users" received in step S201E from the authentication server 4 (step S206). When the entered user information is present in the "user information of the extracted users", the image forming apparatus 1 allows the user to use the image forming apparatus 1 (step S207). Meanwhile, when the entered user information is not present in the "user information of the extracted users", the image forming apparatus 1 prevents the user from using the image forming apparatus 1.

Other configurations and operations of the authentication system AS2 are substantially the same as those of the authentication system AS1 described with reference to FIGS. 1 through 15B, and their descriptions are omitted here.

The second variation of the second exemplary biometric authentication process (P2) described with reference to FIGS. 18 and 19 is different from the first variation of the second exemplary biometric authentication process (P2) described with reference to FIGS. 16 and 17 in that the functions of the biometric authentication unit 18 of the image forming apparatus 1 of FIG. 16 are provided by the authentication server 4 that is connected to the network NW and provided separately from the image forming apparatus 1. Except this difference, the second variation of the second exemplary biometric authentication process (P2) is substantially the same as the first variation of the second exemplary biometric authentication process (P2).

Preferably, the "predetermined conditions" for extracting users may be set freely at the authentication server 4.

According to the second variation of the second exemplary biometric authentication process (P2) described with reference to FIGS. 18 and 19, the authentication server 4 is provided to perform a part of the functions of the biometric authentication unit 34 of the biometric authentication server 3 of FIG. 4. This configuration makes it possible to freely define, at the authentication server 4, rules for determining an authentication result based on "user information of the extracted users" reported from the biometric authentication server 3. This in turn makes it possible to more flexibly define the rules for determining an authentication result.

<Authentication System Employing Cloud Service>

Next, an authentication system employing a cloud service is described with reference to FIGS. 20 through 29.

Figure 20:
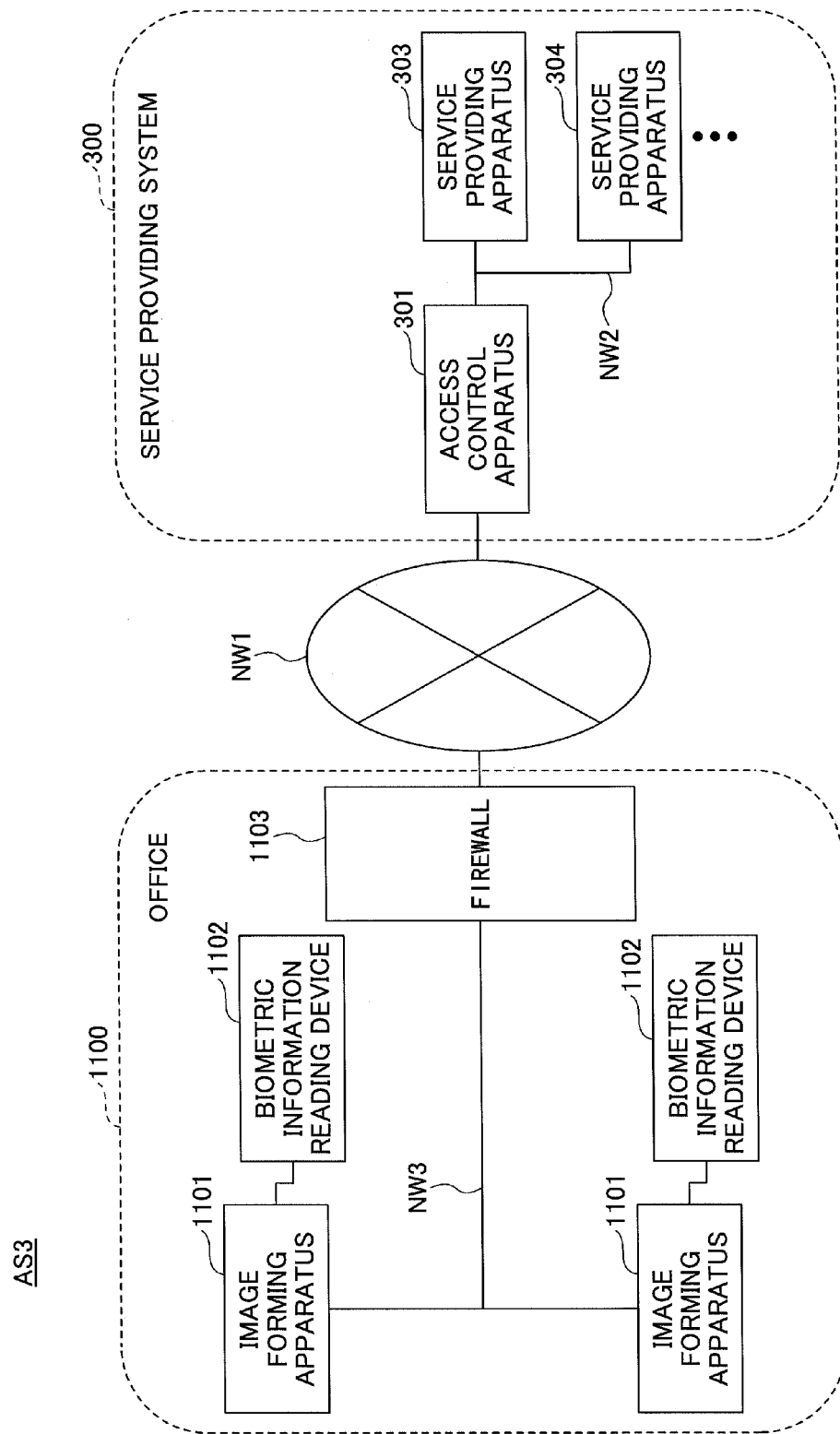
FIG. 20 is a drawing illustrating an exemplary configuration of an authentication system employing a cloud service.

FIG. 20 is a drawing illustrating an exemplary configuration of an authentication system AS3 employing a cloud service. In the authentication system AS3 of FIG. 20, one or more image forming apparatuses 1101 installed in an office 1100 can communicate via a wide-area network NW1 such as the Internet with a service providing system 300. The service providing system 300 is an example of an information processing system according to the present embodiment.

The service providing system 300 is, for example, located in an organization (e.g., company) that provides a cloud service via the network NW1. Although a cloud service is used in the present embodiment, this disclosure may be applied to any other type of service provided via a network such as a service provided by an application service provider (ASP) or a Web service.

The service providing system 300 provides services via the network NW1. The service providing system 300 may include an access control apparatus 301 and service providing apparatuses including a service providing apparatus 303 and a service providing apparatus 304 that are connected to each other via a network NW2 such as a local area network (LAN). Although the service providing apparatuses 303 and 304 are used in the descriptions below, the number of service providing apparatuses is not limited to two. The access control apparatus 301, the service providing apparatus 303, and the service providing apparatus 304 may have a hardware configuration as illustrated in FIG. 3.

The office 1100 is, for example, an office of a company that uses the service provided by the service providing system 300. In the office 1100, the image forming apparatuses 1101 and a firewall 1103 are connected to each other via a network NW3 such as a local area network (LAN). For descriptive purposes, the image forming apparatuses 1101 may be referred to as the image forming apparatus 1101. The image forming apparatus 1101 may have a hardware configuration as illustrated in FIG. 2. Also, the image forming apparatus 1101 may be implemented by a multifunction peripheral including a scanning function, a printing function, a copying function, and a facsimile function.

Although one office 1100 is illustrated in FIG. 20, the service providing system 300 may be connected to plural offices of companies or organizations via the network NW1 and can provide services to those offices.

Figure 21:
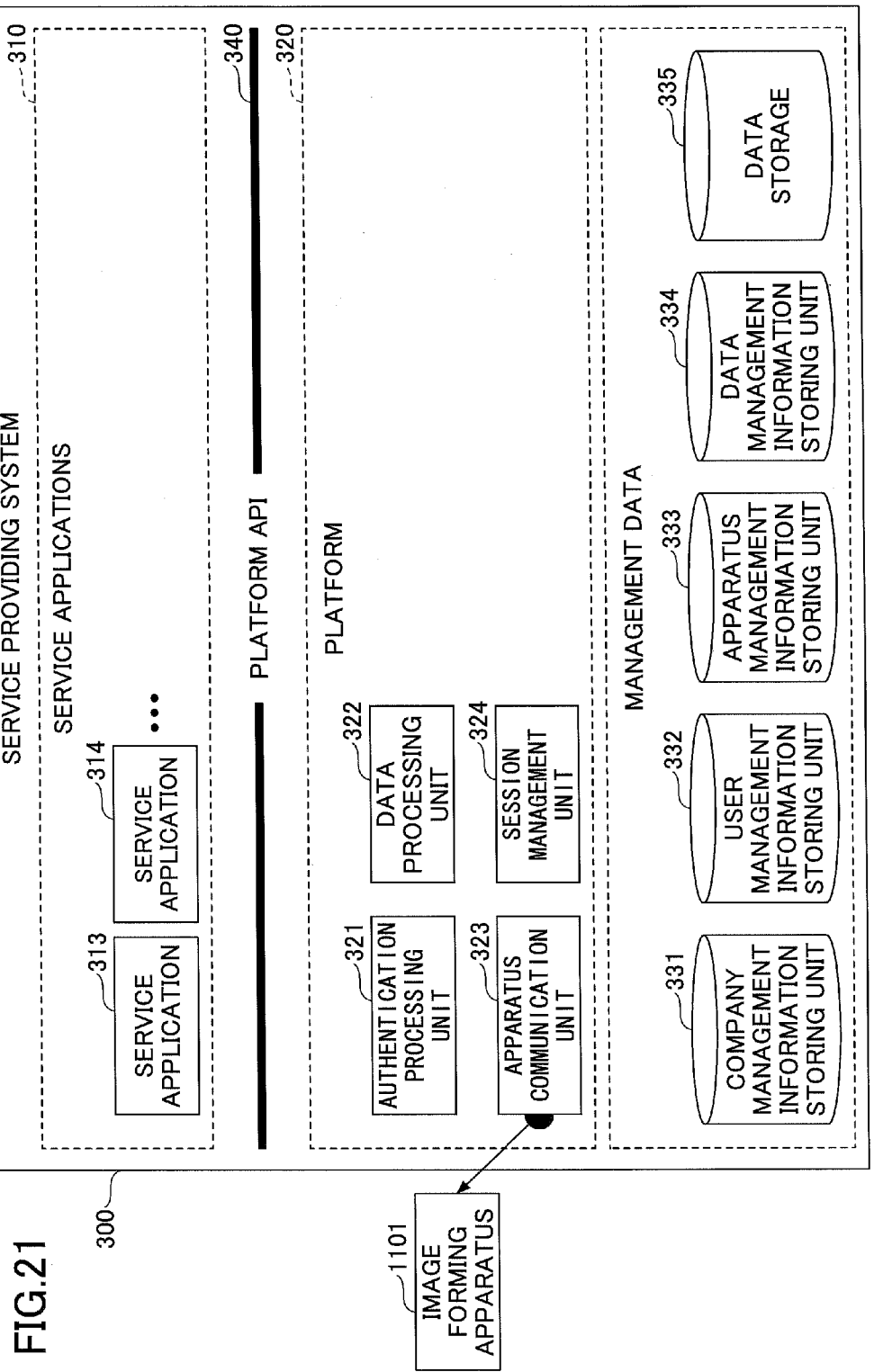
FIG. 21 is a drawing illustrating an exemplary functional configuration of a service providing system for providing a cloud service.

FIG. 21 is a drawing illustrating an exemplary functional configuration of the service providing system 300 for providing a cloud service.

As illustrated in FIG. 21, the service providing system 300 may include service applications 310 and a platform 320. The service applications 310 and the platform 320 may be implemented by one or more programs installed in the access control apparatus 301 and the service providing apparatuses 303 and 304. Assuming that the access control apparatus 301 and the service providing apparatuses 303 and 304 have a hardware configuration as illustrated in FIG. 3, the programs may be executed by the processor 206 of the respective apparatuses to perform various processes. Alternatively, the service providing system 300 of FIG. 21 may be implemented by one service providing apparatus including all functions of the service providing system 300. Also in this case, the service providing apparatus may have a hardware configuration as illustrated in FIG. 3.

The service providing system 300 may also include a company management information storing unit 331, a user management information storing unit 332, an apparatus management information storing unit 333, a data management information storing unit 334, and a data storage 335. Assuming that the access control apparatus 301 and the service providing apparatuses 303 and 304 have a hardware configuration as illustrated in FIG. 3, these storing units may be implemented by the secondary storage unit 204 of the respective apparatuses. Alternatively, the storing units may be implemented by a storage unit (not shown) connected via a network to the service providing system 300.

The platform 320 includes common functions or basic functions that are used by the service applications 310. For example, the platform 320 may include an authentication processing unit 321, a data processing unit 322, an apparatus communication unit 323, and a session management unit 324. The functions of these units are made public to the service applications 310 via a platform application programming interface (API) 340. In other words, the service applications 310 can use the functions of these units that are made public by the platform API 340.

The service applications 310 include a service application 313, a service application 314, and so on that are application programs for providing various services such as a printing service and a scanning service. The service applications 310 are stored in the service providing apparatuses 303 and 304 illustrated in FIG. 20.

The authentication processing unit 321 authenticates users of the image forming apparatuses 1101 and returns authentication results. The authentication processing unit 321 includes a biometric authentication function for performing biometric authentication using biometric authentication information stored in the user management information storing unit 332. Similarly to the biometric authentication information storing unit 33 of FIG. 4, the user management information storing unit 332 stores biometric authentication information (see FIG. 22C) including biometric information and user information associated with the biometric information.

The session management unit 324 manages communication sessions between the service providing system 300 and the image forming apparatuses 1101. The apparatus communication unit 323 controls communications via the networks NW1 and NW3 between the service providing system 300 and the image forming apparatuses 1101. The authentication processing unit 321, the session management unit 324, and the apparatus communication unit 323 may be provided, for example, in the access control unit 301 of FIG. 20.

The data processing unit 322 performs processes on data received from the image forming apparatuses 1101 and data stored in the data storage 335. For example, the data processing unit 322 converts application data into print data and removes stored data. The data processing unit 322 may be provided in each of the access control apparatus 301 and the service providing apparatuses 303 and 304.

The company management information storing unit 331 stores information on companies, organizations, groups, and so on related to services provided by the service providing system 300. The user management information storing unit 332 stores information on users of services provided by the service providing system 300. As described above, the user management information storing unit 332 stores biometric authentication information (see FIG. 22C) including biometric information and user information associated with the biometric information.

The apparatus management information storing unit 333 stores information (e.g., company code described later) related to apparatuses in a user system environment (e.g., an office) that use services provided by the service providing system 300. The data management information storing unit 334 stores information on data stored in the data storage 335. The data storage 335 stores, for example, data received from the image forming apparatuses 1101, data received from other external apparatuses, and data processed based on the received data.

Figure 22A:
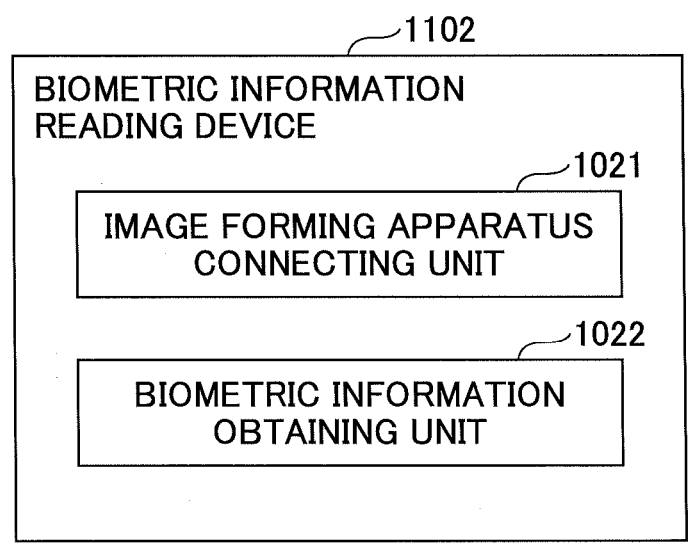
FIG. 22A is a drawing illustrating an exemplary functional configuration of a biometric information reading device.
Figure 22B:
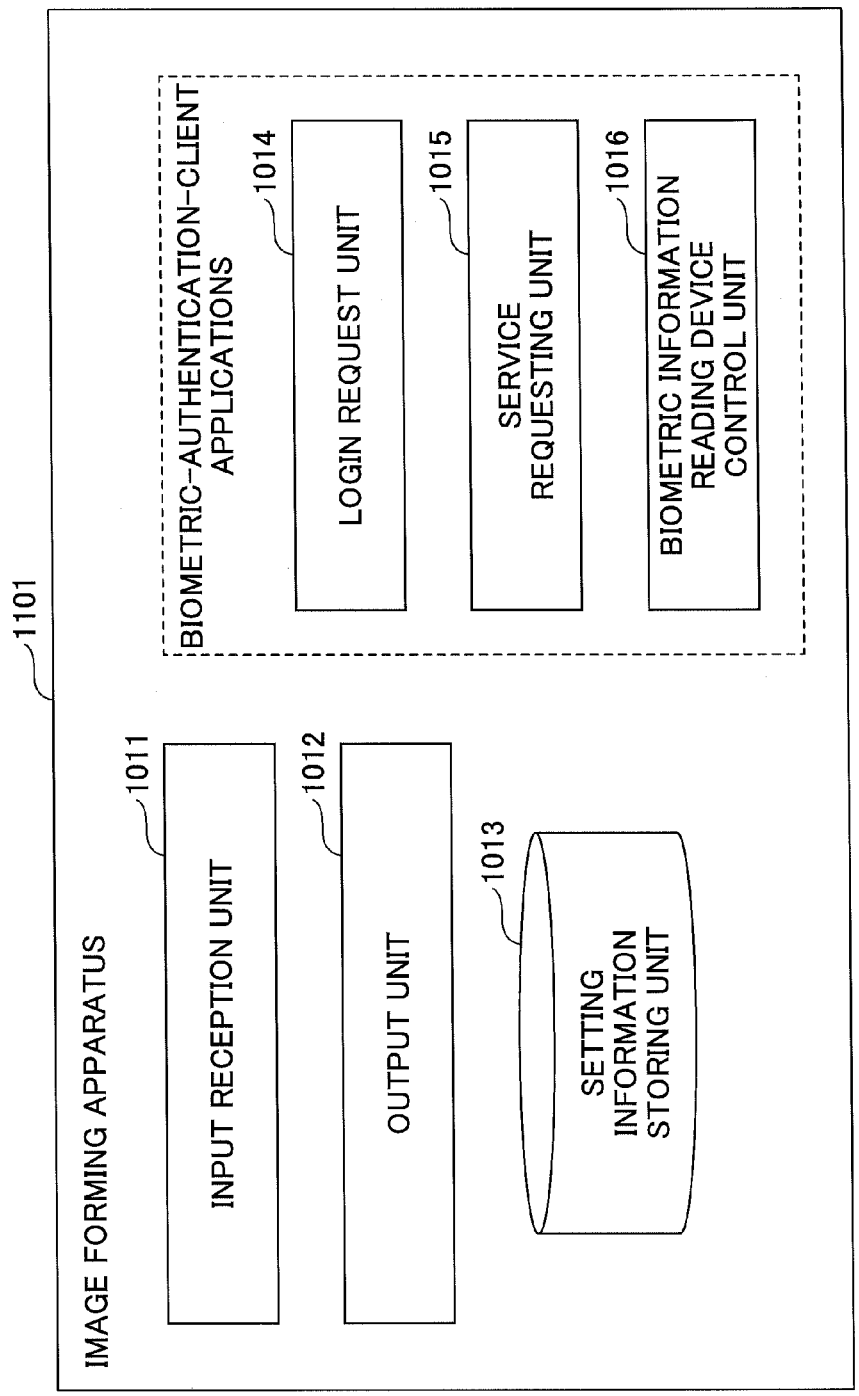
FIG. 22B is a drawing illustrating an exemplary configuration of an image forming apparatus in the authentication system of FIG. 20.

FIG. 22A is a drawing illustrating an exemplary functional configuration of each biometric information reading device 1102 of FIG. 20. FIG. 22B is a drawing illustrating an exemplary functional configuration of the image forming apparatus 1101 of FIG. 20. FIG. 22C is a table illustrating exemplary biometric authentication information stored in the user management information storing unit 332 of FIG. 21.

Referring to FIG. 22B, the image forming apparatus 1101 includes an input reception unit 1011, an output unit 1012, a setting information storing unit 1013, a login request unit 1014, a service requesting unit 1015, and a biometric information reading device control unit 1016. The input reception unit 1011, the output unit 1012, the login request unit 1014, the service requesting unit 1015, and the biometric information reading device control unit 1016 are implemented by executing one or more programs installed in the image forming apparatus 1101 by a processor (CPU). For example, when the image forming apparatus 1101 has a hardware configuration as illustrated in FIG. 2, the processor corresponds to the processor 106. Also when the image forming apparatus 1101 has a hardware configuration as illustrated in FIG. 2, the setting information storing unit 1013 may be implemented by the memory 105 or the secondary storage unit 104.

The input reception unit 1011 receives, for example, user operations (e.g., touch operations) and inputs via an operations panel and a keyboard (not shown) of the image forming apparatus 1101. The login request unit 1014 sends a login request to the service providing system 300. The service requesting unit 1015 requests services of the service providing system 300. The output unit 1012 outputs (e.g., prints and displays) data. The setting information storing unit 1013 stores setting information (e.g., user information, login information) for using services of the service providing system 300. For example, login information may include a company code (or a company ID) for identifying a company to which the image forming apparatus 1101 belongs. The biometric information reading device control unit 1016 controls the biometric information reading device 1102 (e.g., requests the biometric information reading device 1102 to capture biometric information).

Referring to FIG. 22A, the biometric information reading device 1102 includes an image forming apparatus connecting unit 1021 and a biometric information obtaining unit 1022. The biometric information reading device 1102 may have a configuration similar to that of the biometric information reading device 2 of FIG. 4. The image forming apparatus connecting unit 1021 communicates with the image forming apparatus 1101 to receive a request to capture biometric information from and send the captured biometric information to the image forming apparatus 1101. The biometric information obtaining unit 1022 obtains (or captures) biometric information.

The biometric authentication information exemplified in FIG. 22C has a configuration similar to that of the biometric authentication information illustrated in FIG. 7 except that the group ID field is replaced with a company code field.

<First Exemplary Biometric Authentication Process Using Cloud Service>

Next, a first exemplary biometric authentication process (P3) in an authentication system employing a cloud service is described with reference to FIG. 23. The first exemplary biometric authentication process (P3) is similar to the first exemplary biometric authentication process (P1) described with reference to FIGS. 10 through 12 except that a "company code (or company ID)" for identifying a company to which the image forming apparatus 1101 belongs is used instead of "selected group information". Accordingly, in the process of FIG. 23, the step of selecting a group by the user is not necessary. The "company code (or company ID)" is another example of "group information for identifying a group to which a user belongs".

Figure 23:
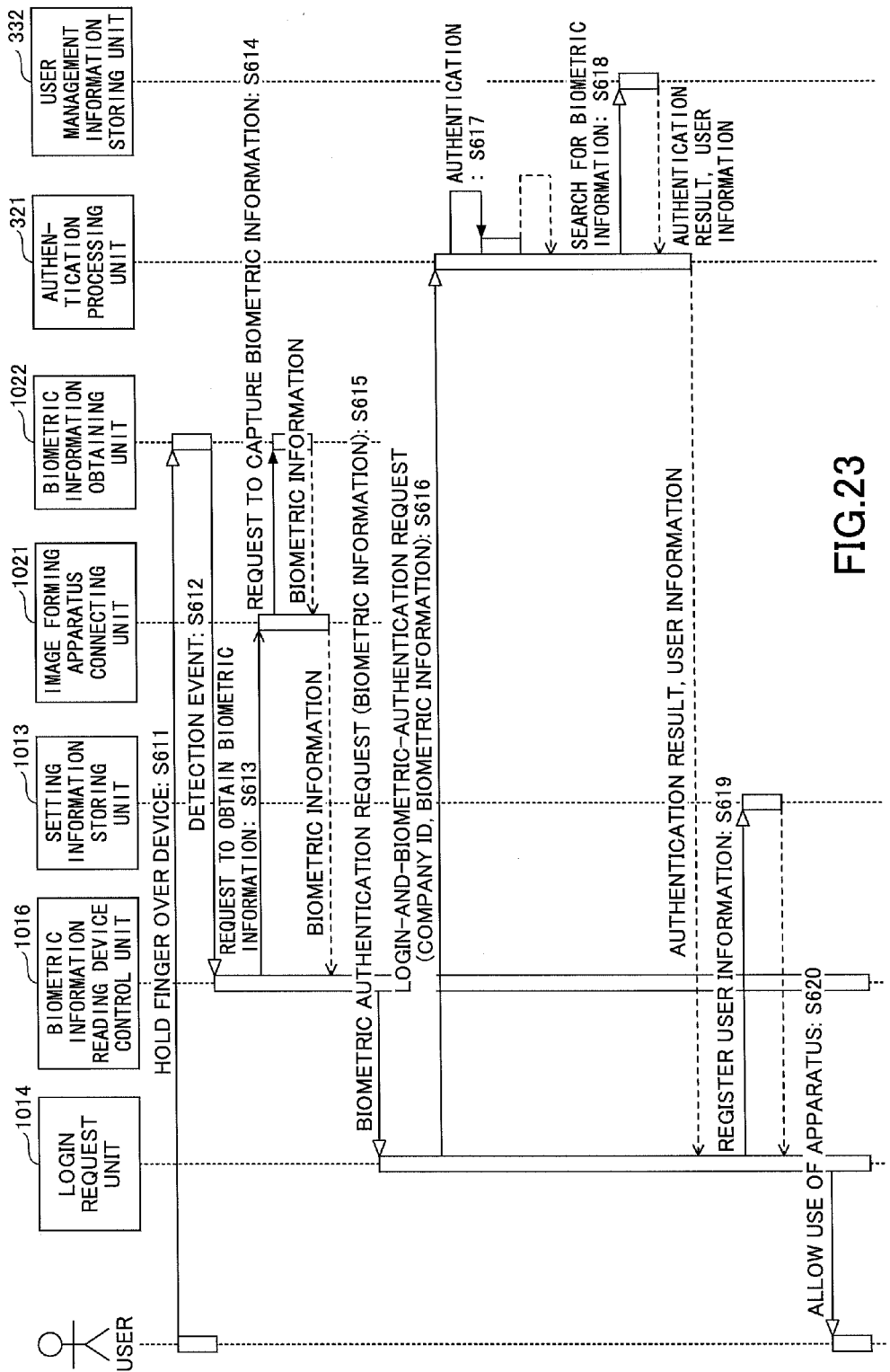
FIG. 23 is a sequence chart illustrating a first exemplary biometric authentication process (P3) in an authentication system employing a cloud service.

Referring to FIG. 23, the user holds, for example, a finger or a palm over the biometric information obtaining unit 1022 of the biometric information reading device 1102 (step S611). When detecting the finger or the palm, the biometric information obtaining unit 1022 sends event information, which indicates that the finger or the palm is held over the biometric information obtaining unit 1022, to the biometric information reading device control unit 1016 of the image forming apparatus 1101 via the image forming apparatus connecting unit 1021 (step S612).

When receiving the event information, the biometric information reading device control unit 1016 requests the image forming apparatus connecting unit 1021 of the biometric information reading device 1102 to obtain biometric information (step S613).

When requested, the image forming apparatus connecting unit 1021 requests the biometric information obtaining 1022 to capture biometric information (step S614). The image forming apparatus connecting unit 1021 receives the captured biometric information from the biometric information obtaining 1022 and sends the captured biometric information to the biometric information reading device control unit 1016 of the image forming apparatus 1101.

The biometric information reading device control unit 1016 sends a biometric authentication request including the captured biometric information to the login request unit 1014 (step S615).

Then, the login request unit 1014 sends a login-and-biometric-authentication request to the authentication processing unit 321 of the service providing system 300 (step S616). For example, the login-and-biometric-authentication request includes the captured biometric information and login information indicating, for example, a company code (or a company ID) for identifying a company to which the image forming apparatus 1101 belongs. The login information is read by the login request unit 1014 from the setting information storing unit 1013 (see FIG. 22B).

The authentication processing unit 321 of the service providing system 300 performs authentication (a login process to the service providing system 300) based on the login information received in step S616 (step S617). When the login process is successful (authentication result is "success"), the authentication processing unit 321 searches the biometric authentication information stored in the user management information storing unit 332 based on the captured biometric information and the login information (company code or ID) received in step S616. More specifically, the authentication processing unit 321 searches the user management information storing unit 332 to find biometric information matching the captured biometric information from sets (or records) of biometric information belonging to the company indicated by the company code (or company ID) (step S618). When matching biometric information is found, the authentication processing unit 321 outputs an authentication result "success" and user information corresponding to the found biometric information. Meanwhile, when matching biometric information is not found, the authentication processing unit 321 outputs an authentication result "failure". In the example of FIG. 23, it is assumed that matching biometric information is found. The authentication processing unit 321 also outputs an authentication result "failure" when the authentication in step S617 fails.

Thus, in step S618, only records of users belonging to a company indicated by the company code (or company ID) are searched to find matching biometric information.

The authentication processing unit 321 sends the authentication result and the user information (when the authentication result is "failure", only the authentication result) to the login request unit 1014 of the image forming apparatus 1101.

The login request unit 1014 of the image forming apparatus 1101 registers the user information in the setting information storing unit 1013 (step S619). When the authentication result is "success", the login request unit 1014 allows the user to use the image forming apparatus 1101 (step S620).

In the process of FIG. 23 described above, a company code (or a company ID) of a company to which the image forming apparatus 1101 belongs is sent in step S616 to the authentication processing unit 321 to log into the service providing system 300. The company code corresponds to "selected group information" used in the process of FIG. 8. Also in the process of FIG. 23, "selected group information" may be obtained and used instead of the group code.

In this case, the user management information storing unit 332 of the service providing system 300 may contain group information as illustrated in FIG. 5, user information as illustrated in FIG. 6, and biometric authentication information as illustrated in FIG. 7 for respective companies (or organizations). Also in this case, the login request unit 1014 may be configured to search the user management information storing unit 332 based on a group code to find sets of group information associated with a company indicated by the group code, and to display a group selection screen as illustrated in FIG. 9 on the image forming apparatus 1101 based on the found sets of group information.

When the user selects a group on the displayed group selection screen, selected group information indicating the selected group is saved. In step S616 of FIG. 23, a login-and-biometric-authentication request including the selected group information and captured biometric information is sent to the authentication processing unit 321. In step S618, the authentication processing unit 321 searches the user management information storing unit 332 to find biometric information matching the captured biometric information from sets of biometric information that belong to the selected group of the corresponding company. Other steps are substantially the same as those described with reference to FIG. 23.

<Second Exemplary Biometric Authentication Process Using Cloud Service>

Next, a second exemplary biometric authentication process (P4) in an authentication system employing a cloud service is described with reference to FIG. 24. Steps S611, S612, S614, and S616 of FIG. 24 are substantially the same as the corresponding steps of FIG. 23. Also, for brevity, steps of FIG. 24 corresponding to steps S613, S615, and S617 of FIG. 23 are omitted.

After step S616, the authentication processing unit 321 of the service providing system 300 performs authentication (login process) based on a company code (or a company ID) in the login-and-biometric-authentication request received from the image forming apparatus 1101 (step S617). When the login process is successful (authentication result is "success"), the authentication processing unit 321 performs biometric authentication based on the company code and captured biometric information in the login-and-biometric-authentication request and the biometric authentication information stored in the user management information storing unit 332 (step S651). Then, the authentication processing unit 321 sends an authentication result ("success", "failure", or "confirmation") to the image forming apparatus 1101.

When the authentication result is other than "failure", the authentication processing unit 321 sends user information together with the authentication result.

Step S651 is similar to step S201 described with reference to FIGS. 14A, 14B, 15A, and 15B. In step S651, however, a company code (or company ID) is used instead of selected group information. Accordingly, in step S651, the authentication processing unit 321 searches records (biometric information) of the biometric authentication information stored in the user management information storing unit 332 that are associated with the company code. Similarly to the process of FIG. 23, the authentication processing unit 321 also sends an authentication result "failure" to the image forming apparatus 1101 when the login process in step S617 fails.

When the authentication result from the authentication processing unit 321 is "success", the image forming apparatus 1101 allows the user to use the image forming apparatus 1101 (step S652). When the authentication result is "failure", the image forming apparatus 1101 prevents the user from using the image forming apparatus 1101 (step S653). When the authentication result is "confirmation", the image forming apparatus 1101 displays a user information input screen (step S654).

When the user information input screen is displayed in step S654 and the user inputs user information (e.g., a user ID) (step S655), the image forming apparatus 1101 performs an additional authentication step. The image forming apparatus 1101 determines whether the entered user information is present in the user information sent together with the authentication result from the authentication processing unit 321 of the service providing system 300 (step S656). When the entered user information is present in the user information sent from the authentication processing unit 321, the image forming apparatus 1101 allows the user to use the image forming apparatus 1101 (step S657). Meanwhile, when the entered user information is not present in the user information sent from the authentication processing unit 321, the image forming apparatus 1101 prevents the user from using the image forming apparatus 1101.

In the above described processes, three types of authentication results ("success", "failure", and "confirmation") are used. However, the types or the number of authentication results are not limited to those described above. For example, the authentication result may be set as "success" when the matching rate is greater than or equal to 95% and set as "confirmation" when the matching rate is less than 95%.

Also, the second exemplary biometric authentication process (P4) is not necessarily based on the first exemplary biometric authentication process (P3). For example, the second exemplary biometric authentication process (P4) may be performed based only on the captured biometric information received from the image forming apparatus 1101 without using the company code. In other words, instead of comparing captured biometric information with sets of biometric information belonging to a company indicated by the company code, the captured biometric information may be compared with all sets of biometric information stored in the user management information storing unit 332. In the second exemplary biometric authentication process (P4), biometric authentication is combined with authentication based on input user information to improve the accuracy and efficiency of authentication.

In biometric authentication such as fingerprint authentication, biometric information obtained from the same user may not be always the same. For example, there may be a case where it becomes difficult to correctly capture a fingerprint of a user after the user performs a certain task. As a result, the same user may be successfully authenticated at one occasion but not successfully authenticated at another occasion. Instead of determining success or failure based only on biometric authentication, combining biometric authentication with another authentication method makes it possible to more flexibly and efficiently perform authentication.

Although biometric authentication and authentication based on input user information are combined in the second exemplary biometric authentication process (P4), biometric authentication may be combined with any other authentication method such as authentication using a card. That is, the above described approach may be applied to an authentication system where different authentication methods, i.e., a first authentication method and a second authentication method, are used in combination. In such an authentication system, an authentication result of the first authentication method may be used when the authentication result is "success", and authentication based on the second authentication method may be performed when the authentication result is not "success".

Also, more than two authentication methods may be combined, or a second authentication method may be selected from plural authentication methods based on the authentication result of the first authentication method. In this case, conditions corresponding to respective authentication methods may be defined. For example, when the matching rate of biometric authentication according to the first authentication method is greater than or equal to 80% and less than 85%, "confirmation" may be performed based on a second authentication method. When the matching rate of biometric authentication according to the first authentication method is greater than or equal to 85% and less than 90%, "confirmation" may be performed based on a third authentication method. When the matching rate of biometric information in the first authentication method is greater than or equal to 90% and less than 95%, "confirmation" may be performed based on a fourth authentication method.

<First Variation of Second Exemplary Biometric Authentication Process Using Cloud Service>

Next, a first variation of the second exemplary biometric authentication process (P4) in an authentication system employing a cloud service is described with reference to FIGS. 25A, 25B, and 26. The first variation of the second exemplary biometric authentication process (P4) is similar to the first variation of the second exemplary biometric authentication process (P2) described with reference to FIGS. 16 through 17.

Figure 25A:
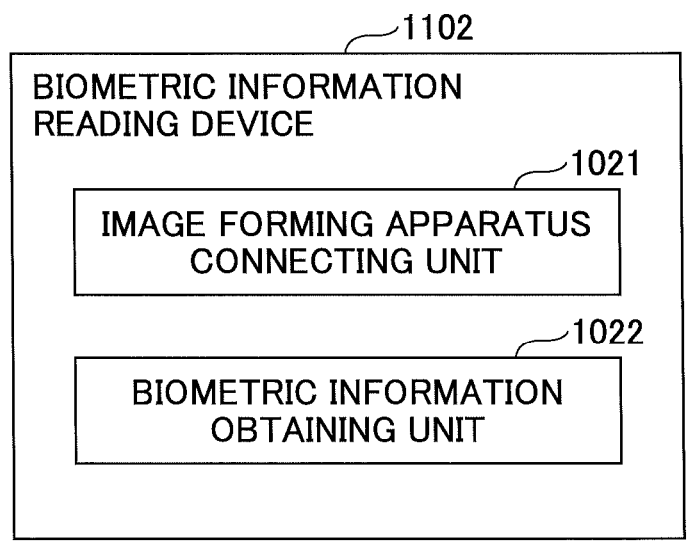
FIG. 25A is a drawing illustrating an exemplary functional configuration of a biometric information reading device adapted for a first variation of the second exemplary biometric authentication process (P4)

FIG. 25A is a drawing illustrating an exemplary functional configuration of a biometric information reading device 1102 adapted for the first variation of the second exemplary biometric authentication process (P4). FIG. 25B is a drawing illustrating an exemplary functional configuration of an image forming apparatus 1101 adapted for the first variation of the second exemplary biometric authentication process (P4). FIG. 26 is a sequence chart illustrating the first variation of the second exemplary biometric authentication process (P4).

Figure 25B:
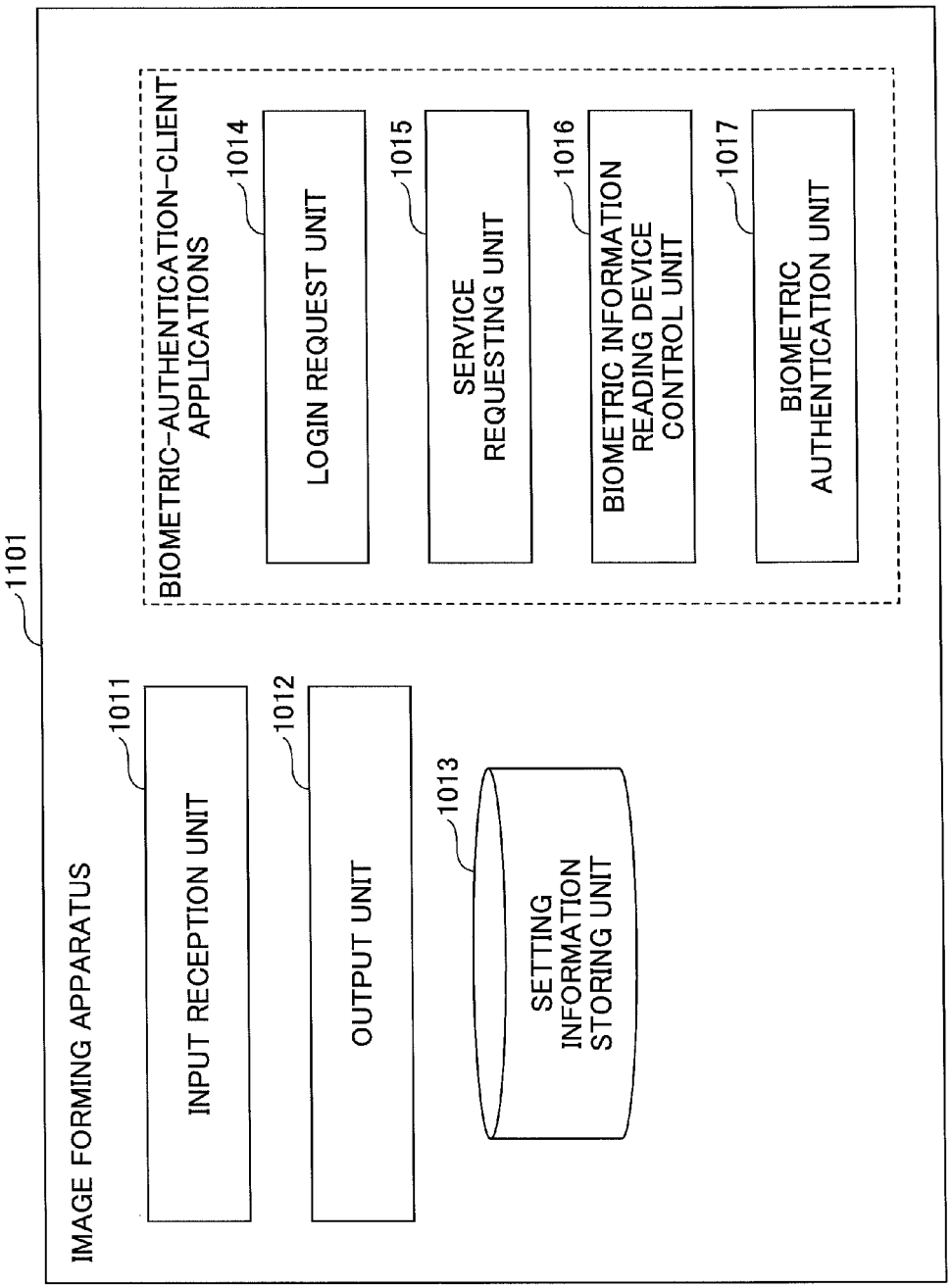
FIG. 25B is a drawing illustrating an exemplary functional configuration of an image forming apparatus adapted for the first variation of the second exemplary biometric authentication process (P4)

The functional configurations illustrated in FIGS. 25A and 25B are different from the functional configurations illustrated in FIGS. 22A and 22B in that a biometric authentication unit 1017 is added to the image forming apparatus 1101. Other functional units of FIGS. 25A and 25B are substantially the same as those of FIGS. 22A and 22B. The biometric authentication unit 1017 may be implemented by executing a program installed in the image forming apparatus 1101 by the processor 106 (when the image forming apparatus 1101 has the hardware configuration of FIG. 2).

The process of FIG. 26 is different from the process of FIG. 24 in steps S651A and S651B. In the process of FIG. 26, the authentication processing unit 321 of the service providing system 300 extracts users matching predetermined conditions (step S651A) instead of performing biometric authentication (step S651 of FIG. 24). Then, the authentication processing unit 321 sends user information of the extracted users to the image forming apparatus 1101.

When receiving the user information from the authentication processing unit 321, the biometric authentication unit 1017 of the image forming apparatus 1101 performs authentication (step S651B). Based on the result of authentication, the biometric authentication unit 1017 allows the user to use the image forming apparatus 1101 (step S652, when the authentication result is "success"), prevents the user from using the image forming apparatus 1101 (step S653, when the authentication result is "failure"), or displays a user information input screen (step S654, when the authentication result is "confirmation"). Steps S655 through S657 are substantially the same as those of FIG. 24.

Other configurations and operations of the authentication system are substantially the same as those described with reference to FIGS. 20 through 24, and their descriptions are omitted here.

The "predetermined conditions" for extracting users are, for example, "matching rate≥95%" and "matching rate≥90%". In this case, "users that match predetermined conditions" are "users with matching rates greater than or equal to 95%" and "users with matching rates greater than or equal to 90%". Also in this case, the "user information of the extracted users" sent from the authentication processing unit 321 to the image forming apparatus 1101 is, for example, "matching rate≥95%: user A; matching rate≥90%: users A and B".

When receiving the "user information of the extracted users", the biometric authentication unit 1017 of the image forming apparatus 1101 performs authentication according to the flowchart of FIG. 14A or 14B, and outputs an authentication result indicating "success", "failure", or "confirmation". For example, when user information "matching rate≥95%: user A; matching rate≥90%: users A and B" is received, the result of step S2011 of FIG. 14A becomes "YES" and the result of step S2012 becomes "two or more". Therefore, in this case, the biometric authentication unit 1017 outputs an authentication result "confirmation". Meanwhile, in the case of FIG. 14B, the result of step S2014 becomes "YES" and the result of step S2015 becomes "one". In this case, the biometric authentication unit 1017 outputs an authentication result "success".

Preferably, the "predetermined conditions" for extracting users may be set freely at the image forming apparatus 1101.

According to the first variation of the second exemplary biometric authentication process (P4) described above with reference to FIGS. 25A, 25B, and 26, the image forming apparatus 1101 includes the biometric authentication unit 1017 that has a part of the biometric authentication function provided by the authentication processing unit 321 in the configuration illustrated in FIG. 21. This configuration makes it possible to freely define, at the image forming apparatus 1101, rules for determining an authentication result based on "user information of the extracted users" reported from the authentication processing unit 321. This in turn makes it possible to more flexibly define the rules for determining an authentication result.

<Second Variation of Second Exemplary Biometric Authentication Process Using Cloud Service>

A second variation of the second exemplary biometric authentication process (P4) in an authentication system employing a cloud service is described below with reference to FIGS. 27 through 29. The second variation of the second exemplary biometric authentication process (P4) is similar to the second variation of the second exemplary biometric authentication process (P2) described with reference to FIGS. 18 and 19.

Figure 27:
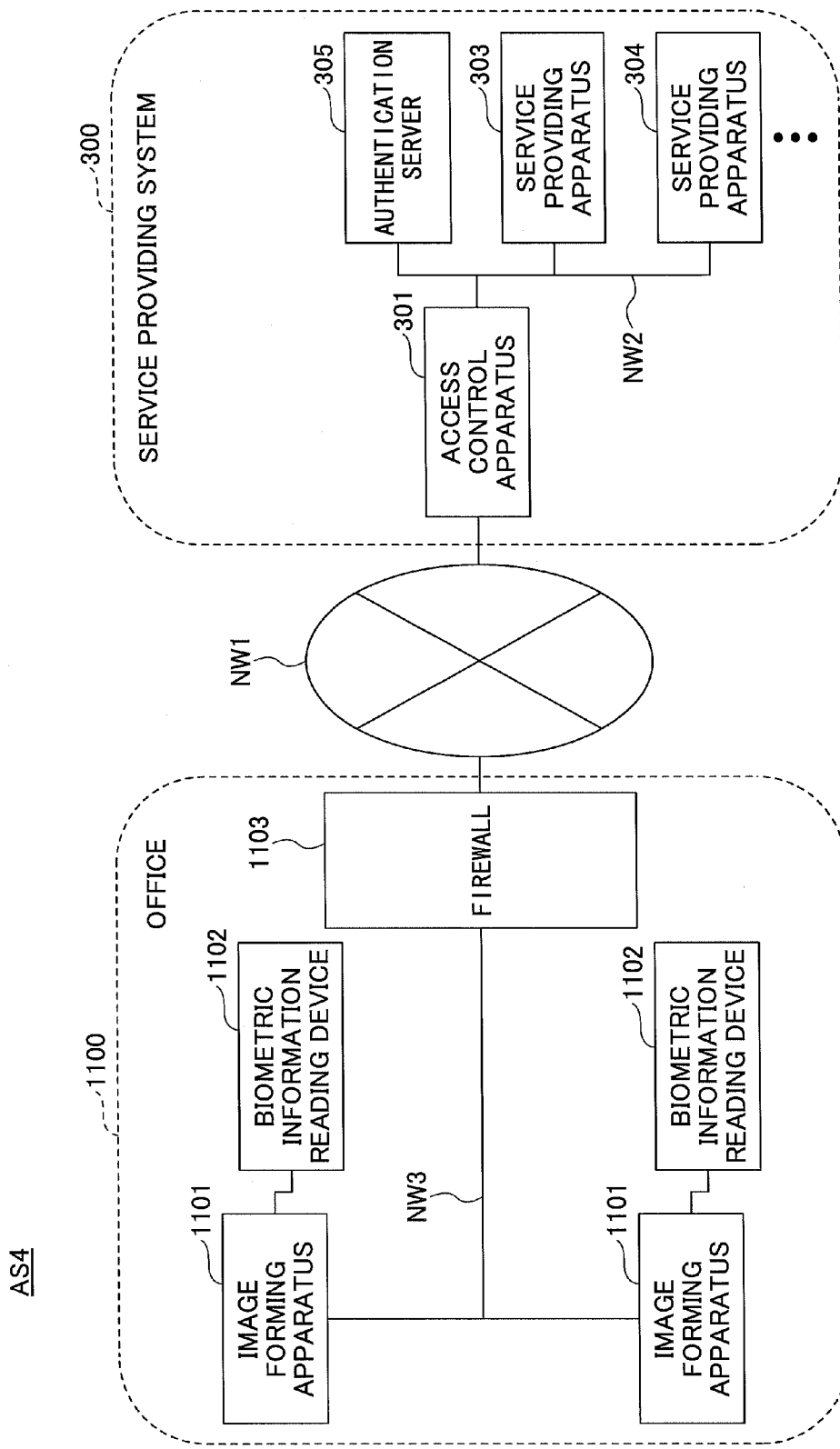
FIG. 27 is a drawing illustrating an exemplary configuration of an authentication system adapted for a second variation of the second exemplary biometric authentication process (P4)

FIG. 27 is a drawing illustrating an exemplary configuration of an authentication system AS4 adapted for the second variation of the second exemplary biometric authentication process (P4). FIG. 28 is a drawing illustrating an exemplary functional configuration of the service providing system 300 in the authentication system AS4 of FIG. 27. FIG. 29 is a sequence chart illustrating the second variation of the second exemplary biometric authentication process (P4).

The authentication system AS4 of FIG. 27 is different from the authentication system AS3 of FIG. 20 in that an authentication server 305 is added to the service providing system 300. The authentication server 305 can communicate via the network NW2 with the access control apparatus 301, the service providing apparatus 303, and the service providing apparatus 304 of the service providing system 300. Also, similarly to the service providing apparatuses 303 and 304, the authentication server 305 can communicate with the image forming apparatuses 1101 and the biometric information reading device 1101 via the network NW2, the access control apparatus 301, the network NW1, the firewall 1103, and the network NW3. Other configurations of the authentication system AS4 are substantially the same as those of the authentication system AS3 of FIG. 20.

Figure 28:
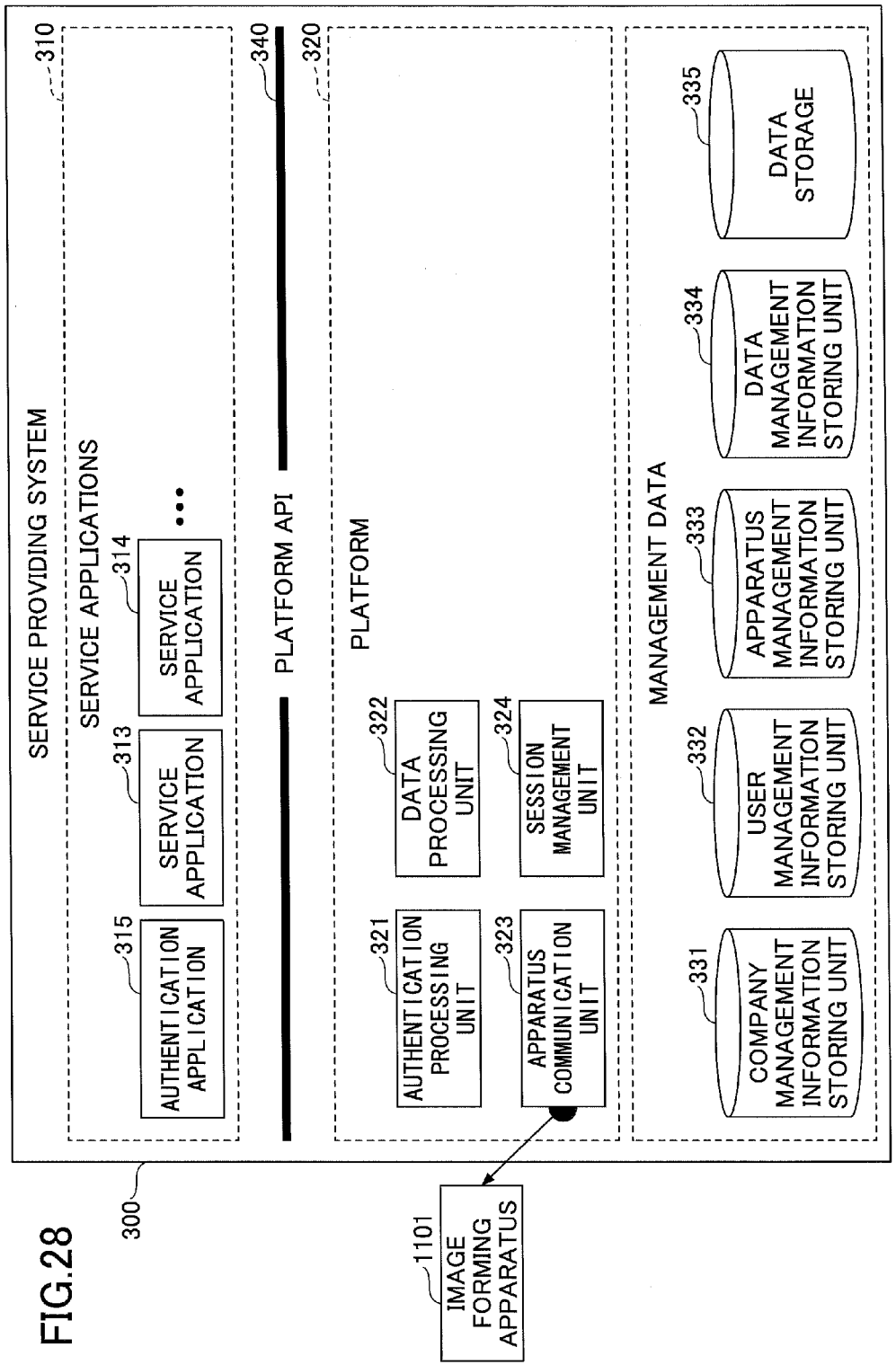
FIG. 28 is a drawing illustrating an exemplary functional configuration of a service providing system for providing a cloud service adapted for the second variation of the second exemplary biometric authentication process (P4)

The service providing system 300 of FIG. 28 is different from the service providing system 300 of FIG. 21 in that the authentication processing unit 321 includes a function to report users matching predetermined conditions instead of the function to perform biometric authentication. Also, an authentication application 315 is added to the service applications 310. The authentication application 315 is installed in the authentication server 305, i.e., the authentication server 305 provides the function of the authentication application 315. Other configurations of the service providing system 300 of FIG. 28 are substantially the same as those of the service providing system 300 of FIG. 21.

The process of FIG. 29 is different from the process of FIG. 26 in steps S651A through S651E. Similarly to the process of FIG. 26, instead of performing authentication (step S651 of FIG. 24), the authentication processing unit 321 of the service providing system 300 extracts users that match predetermined conditions (step S651A). However, instead of sending user information of the extracted users to the image forming apparatus 1101, the authentication processing unit 321 sends the user information to the authentication application 315 of the service providing system 300. When receiving the user information from the authentication processing unit 321, the authentication application 315 performs authentication (step S651B) which is performed by the image forming apparatus 1101 in the process of FIG. 26.

Based on the result of authentication in step S651B, the authentication application 315 sends permission information to the image forming apparatus 1101 to allow the user to use the image forming apparatus 1101 (step S651C, when the authentication result is "success"), sends non-permission information to the image forming apparatus 1101 to prevent the user from using the image forming apparatus 1101 (step S651D, when the authentication result is "failure"), or requests the image forming apparatus 1101 to display a user information input screen (step S651E, when the authentication result is "confirmation"). In step S651E, the authentication application 315 sends a user information input request including "user information of the extracted users", which is sent from the authentication processing unit 321 in step S651A, to the image forming apparatus 1101.

When receiving the permission information (S651C), the non-permission information (S651D), or the user information input request (S651E), the image forming apparatus 1101 allows the user to use the image forming apparatus 1101 (step S652, when the permission information is received), prevents the user from using the image forming apparatus 1101 (step S653, when the non-permission information is received), or displays a user information input screen (step S654, when the user information input request is received).

When the user information input screen is displayed in step S654 and the user inputs user information (e.g., a user ID) (step S655), the image forming apparatus 1101 performs an additional authentication step. The image forming apparatus 1101 determines whether the entered user information is present in the "user information of the extracted users" received in step S651E from the authentication processing unit 321 (step S656). When the entered user information is present in the "user information of the extracted users", the image forming apparatus 1101 allows the user to use the image forming apparatus 1101 (step S657). Meanwhile, when the entered user information is not present in the "user information of the extracted users", the image forming apparatus 1101 prevents the user from using the image forming apparatus 1101.

Other configurations and operations of the authentication system AS4 are substantially the same as those of the authentication system AS3 described with reference to FIGS. 20 through 24, and their descriptions are omitted here.

The second variation of the second exemplary biometric authentication process (P4) described with reference to FIGS. 27 through 29 is different from the first variation of the second exemplary biometric authentication process (P4) described with reference to FIGS. 25A, 25B, and 26 in that the functions of the biometric authentication unit 1017 of the image forming apparatus 1101 of FIG. 25B are provided by the authentication server 305 (the authentication application 315). In the configuration of the authentication system AS4, the authentication server 305 (the authentication application 315) is provided in the service providing system 300 that is managed by an organization (or a company) that is different from an organization (or a company) to which the office 1100 including the image forming apparatus 1101 belongs.

Preferably, the "predetermined conditions" for extracting users may be set freely at the authentication server 305 (the authentication application 315).

According to the second variation of the second exemplary biometric authentication process (P4) described with reference to FIGS. 27 through 29, the authentication application 315 performs a part of the biometric authentication function that is provided by the authentication processing unit 321 in the configuration of FIG. 21. This configuration makes it possible to freely define, at the authentication application 315, rules for determining an authentication result based on "user information of the extracted users" reported from the authentication processing unit 321. This in turn makes it possible to more flexibly define the rules for determining an authentication result.

In an authentication system according to an embodiment, a biometric authentication process as describe below is performed to authenticate the user of the image forming apparatus 1. The image forming apparatus 1 sends selected group information indicating a group selected by the user (or retained in the image forming apparatus 1) and captured biometric information of the user obtained by the biometric information reading device 2 to the biometric authentication server 3 to request authentication of the user. The biometric authentication server 3 limits the range of biometric information (or users) to be searched based on the selected group information and searches for the captured biometric information within the limited range of biometric information. This configuration makes it possible to more efficiently and quickly perform an authentication process.

In an authentication system according to another embodiment, a biometric authentication process as describe below is performed to authenticate the user of the image forming apparatus 1101. The image forming apparatus 1101 sends a retained company code (or a company ID) and captured biometric information of the user obtained by the biometric information reading device 1102 to the service providing system 300 to request authentication of the user. The service providing system 300 limits the range of biometric information (or users) to be searched based on the company code information and searches for the captured biometric information within the limited range of biometric information. This configuration makes it possible to more efficiently and quickly perform an authentication process.

According to an embodiment, the biometric authentication server 3, the image forming apparatus 1, or the authentication server 4 determines an authentication result "success" or "failure" based on the matching rate of biometric information and the number of matching users (sets of matching biometric information). Also, when the matching rate is not high enough for "success" and not low enough for "failure" and/or the number of matching users is greater than one, the authentication result is set as "confirmation". When the authentication result is "confirmation", the image forming apparatus 1 requests the user to enter additional user information (e.g., a user ID) and compares the entered user information with user information received from the biometric authentication server 3 to determine whether to allow the user to use the image forming apparatus 1. This configuration makes it possible to improve the accuracy of authentication.

According to an embodiment, the service providing system 300 or the image forming apparatus 1101 determines an authentication result "success" or "failure" based on the matching rate of biometric information and the number of matching users (sets of matching biometric information). Also, when the matching rate is not high enough for "success" and not low enough for "failure" and/or the number of matching users is greater than one, the authentication result is set as "confirmation". When the authentication result is "confirmation", the image forming apparatus 1101 requests the user to enter additional user information (e.g., a user ID) and compares the entered user information with user information received from the service providing system 300 to determine whether to allow the user to use the image forming apparatus 1101. This configuration makes it possible to improve the accuracy of authentication.

In the embodiments described with reference to FIGS. 1 through 29, the image forming apparatus 1, 1101 obtains biometric information from the biometric information reading device 2, 1102 externally connected to the image forming apparatus 1, 1101. Alternatively, the image forming apparatus 1, 1101 may include a biometric information reading device.

Also in the embodiments described with reference to FIGS. 1 through 29, an authenticated user is allowed to use an image forming apparatus. However, the present invention may also be applied to authentication of a user of any other type of apparatus. For example, the present invention may be applied to authentication of a user of a document management apparatus for storing and managing document file, a projector, or a personal computer (PC). Also, the present invention may be applied to a case where an apparatus (e.g., a PC) for controlling an authentication process and receiving an authentication result is different from an apparatus (e.g., a printer directly connected to the PC) whose user is to be authenticated.

Also in the embodiments described with reference to FIGS. 1 through 29, biometric information is used as user identification information for authenticating a user. However, instead of biometric information, any other type of user identification information such as user information (e.g., a user ID and a password) may be used to authenticate a user. Even in this case, it is possible to limit the range of records (or users) to be searched based on selected group information or a company code (or a company ID) and search for the user information within the limited range of records in order to efficiently and quickly perform an authentication process.

An aspect of this disclosure provides an authentication system, an authentication method, and an apparatus that make it possible to efficiently and quickly perform an authentication process even in an environment where a large number of users exist.

The present invention is not limited to the specifically disclosed embodiments, and variations and modifications may be made without departing from the scope of the present invention.

What is claimed is:

1. An authentication system, comprising:
an apparatus; and
an authentication apparatus configured to perform authentication of a user of the apparatus,
wherein the apparatus includes
an identification information obtaining unit configured to obtain identification information of the user,
an authentication requesting unit configured to send the obtained identification information and group information indicating a group to which the user belongs to the authentication apparatus to request authentication of the user, and
a display unit configured to display a user information input screen based on a result of the authentication,
a second authentication unit configured to compare user information entered by the user via the user information input screen with user information sent from the authentication apparatus to authenticate the user, and
wherein the authentication apparatus includes a first authentication unit configured to search records of identification information associated with the group information to find matching identification information matching the obtained identification information of the user, and
wherein the display unit is configured to display the user information input screen when the obtained identification information of the user matches the identification information of plural users among the records of identification information.

2. The authentication system as claimed in claim 1, wherein
the apparatus further includes
a group information obtaining unit configured to obtain sets of group information registered in the authentication apparatus; and
a group selection screen display unit configured to display a group selection screen based on the obtained sets of group information,
wherein the authentication requesting unit is configured to send the group information that is selected by the user on the group selection screen to the authentication apparatus together with the identification information.

3. The authentication system as claimed in claim 1, wherein the identification information is biometric information of the user.

4. The authentication system as claimed in claim 3, wherein the authentication apparatus further includes
a biometric information storing unit configured to store records of biometric information of users; and
a reporting unit configured to send, to the apparatus, a result of the authentication determined based on a number of records of matching biometric information in the biometric information storing unit whose matching rates with the obtained biometric information satisfy a predetermined condition and user information of the users corresponding to the records of matching biometric information.

5. The authentication system as claimed in claim 3, wherein the authentication apparatus further includes
a biometric information storing unit configured to store records of biometric information of users, and
a reporting unit configured to send, to the apparatus, user information of the users corresponding to records of matching biometric information in the biometric information storing unit whose matching rates with the obtained biometric information satisfy a predetermined condition together with the predetermined condition; and
wherein the apparatus further includes an authentication result determining unit configured to determine a result of the authentication based on a number of the records of matching biometric information indicated by the user information received from the reporting unit.

6. The authentication system as claimed in claim 3, further comprising:
a second authentication apparatus,
wherein the authentication apparatus further includes
a biometric information storing unit configured to store records of biometric information of users, and
a reporting unit configured to send, to the second authentication apparatus, user information of the users corresponding to records of matching biometric information in the biometric information storing unit whose matching rates with the obtained biometric information satisfy a predetermined condition together with the predetermined condition; and
wherein the second authentication apparatus includes a result reporting unit configured to
determine a result of the authentication based on a number of the records of matching biometric information indicated by the user information received from the reporting unit, and
send the result of the authentication and the user information to the apparatus.

7. The authentication system as claimed in claim 6, wherein the
second authentication unit configured to compare user information entered by the user via the user information input screen and the user information sent from the second authentication apparatus to authenticate the user.

8. The authentication system as claimed in claim 1, further comprising:
   an identification information reading device connected to the apparatus,
   wherein the identification information obtaining unit is configured to obtain the identification information of the user via the identification information reading device.

9. The authentication system as claimed in claim 1, wherein the authentication apparatus is located in an organization that is different from an organization where the apparatus is located.

10. The authentication system as claimed in claim 9, wherein the group information identifies the organization where the apparatus is located.

11. A method of performing user authentication for an authentication system including an apparatus and an authentication apparatus, the method comprising:
   obtaining, by the apparatus, identification information of a user of the apparatus;
   sending, by the apparatus, the obtained identification information and group information indicating a group to which the user belongs to the authentication apparatus to request authentication of the user;
   displaying, by a display unit, a user information input screen based on a result of the authentication,
   comparing, by a second authentication unit, user information entered by the user via the user information input screen with user information sent from the authentication apparatus to authenticate the user,
   searching, by a first authentication apparatus, records of identification information associated with the group information to find matching identification information matching the obtained identification information of the user, and
   displaying, by the display unit, the user information input screen when the obtained identification information of the user matches the identification information of plural users among the records of identification information.

12. An apparatus connected to an authentication apparatus in an authentication system, said authentication apparatus having a first authentication unit configured to search records of identification information associated with group information to find matching identification information matching identification information of a user, the apparatus comprising:
   an identification information obtaining unit configured to obtain the identification information of the user of the apparatus;
   a group information obtaining unit configured to obtain sets of group information registered in the authentication apparatus;
   a group selection screen display unit configured to display a group selection screen based on the obtained sets of group information;
   an authentication requesting unit configured to send group information selected by the user on the group selection screen and the obtained identification information to the authentication apparatus to request authentication of the user,
   a display unit configured to display a user information input screen based on a result of the authentication, and
   a second authentication unit configured to compare user information entered by the user via the user information input screen with user information sent from the authentication apparatus to authenticate the user,
   wherein the display unit is configured to display the user information input screen when the obtained identification information of the user matches the identification information of plural users among the records of identification information.

\* \* \* \* \*